(12) United States Patent
Kim et al.

(10) Patent No.: US 10,140,769 B2
(45) Date of Patent: Nov. 27, 2018

(54) ELECTRONIC DEVICE AND METHOD FOR PROVIDING MAP SERVICE

(71) Applicant: Samsung Electronics Co., Ltd., Gyeonggi-do (KR)

(72) Inventors: Kyung-Tae Kim, Gyeonggi-do (KR); Shin-Jun Lee, Gyeonggi-do (KR); Eun-Seon Noh, Gyeonggi-do (KR); Sun-Kee Lee, Gyeonggi-do (KR); Cheol-Ho Cheong, Seoul (KR); Hyung-Jin Park, Gyeonggi-do (KR); Yo-Han Lee, Gyeonggi-do (KR); Dong-Soo Han, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/950,168

(22) Filed: Nov. 24, 2015

(65) Prior Publication Data
US 2016/0148417 A1 May 26, 2016

(30) Foreign Application Priority Data
Nov. 24, 2014 (KR) .................. 10-2014-0164510

(51) Int. Cl.
*G06T 19/00* (2011.01)
*G06F 3/14* (2006.01)
*G05D 1/02* (2006.01)

(52) U.S. Cl.
CPC ......... *G06T 19/006* (2013.01); *G05D 1/0274* (2013.01); *G06F 3/14* (2013.01);
(Continued)

(58) Field of Classification Search
CPC .................................. G06F 3/04815
See application file for complete search history.

(56) References Cited

U.S. PATENT DOCUMENTS 6,271,842 B1 * 8/2001 Bardon ............... G06F 3/04815
715/848
6,515,688 B1 * 2/2003 Berry ................. G06F 3/04815
715/764

(Continued)

FOREIGN PATENT DOCUMENTS

KR 10-2012-0063508 A1 6/2012
KR 10-2013-0038757 A 4/2013

OTHER PUBLICATIONS

International Search Report, dated Feb. 29, 2016.
European Search Report, dated Apr. 4, 2016.

*Primary Examiner* — Jitesh Patel
(74) *Attorney, Agent, or Firm* — Cha & Reiter, LLC

(57) ABSTRACT

Provided is an electronic device and method for providing three-dimensional (3D) map processing and a 3D map service. The electronic device includes a memory configured to store an image set and a map platform module which is functionally connected with the memory and is implemented with a processor. The map platform module is configured to obtain an image set comprising a plurality of images for a path on an external space surrounding the electronic device, to determine an area corresponding to an object included in the external space from at least one of the plurality of images, to obtain information about the object based on whether the object is configured to communicatively connect with the electronic device, and to display the information in association with the area through a display functionally connected with the electronic device. Other embodiments are also possible.

21 Claims, 18 Drawing Sheets

(52) U.S. Cl.
CPC .............. *G05D 2201/0203* (2013.01); *G09G 2370/025* (2013.01); *G09G 2370/04* (2013.01); *G09G 2370/16* (2013.01)

(56) References Cited

U.S. PATENT DOCUMENTS

| | | | | |
|---|---|---|---|---|
| 6,587,784 B1* | 7/2003 | Okude | ................. | G08G 1/0969 701/454 |
| 9,538,160 B1* | 1/2017 | Cole | ................. | H04N 13/0239 |
| 2001/0037163 A1* | 11/2001 | Allard | ................. | B25J 9/1689 700/245 |
| 2003/0025788 A1* | 2/2003 | Beardsley | ............. | G06T 7/0042 348/43 |
| 2003/0080978 A1* | 5/2003 | Navab | ................. | G01S 5/16 345/633 |
| 2004/0096082 A1* | 5/2004 | Nakai | ................. | G06K 9/00651 382/104 |
| 2004/0104941 A1* | 6/2004 | Natoli | ................. | G06F 3/014 715/772 |
| 2006/0025888 A1* | 2/2006 | Gutmann | ........... | G06K 9/00664 700/245 |
| 2006/0103650 A1 | 5/2006 | Kamiwada et al. | | |
| 2006/0221072 A1* | 10/2006 | Se | ................. | G01C 11/06 345/420 |
| 2007/0219645 A1* | 9/2007 | Thomas | ................. | G05B 15/02 700/29 |
| 2008/0200205 A1* | 8/2008 | Liu | ................. | G06F 3/0346 455/556.1 |
| 2008/0310707 A1* | 12/2008 | Kansal | ................. | G06T 19/006 382/154 |
| 2010/0017722 A1* | 1/2010 | Cohen | ................. | A63F 13/10 715/740 |
| 2010/0073366 A1* | 3/2010 | Tateno | ................. | G06T 17/20 345/419 |
| 2010/0220176 A1* | 9/2010 | Ziemeck | ............ | A61N 1/36046 348/50 |
| 2011/0016405 A1* | 1/2011 | Grob | ................. | H04N 1/00127 715/740 |
| 2011/0037712 A1 | 2/2011 | Kim et al. | | |
| 2011/0115816 A1* | 5/2011 | Brackney | ................. | G06Q 10/06 345/629 |
| 2011/0138310 A1* | 6/2011 | Gomez | ................. | H04L 41/082 715/769 |
| 2011/0187725 A1* | 8/2011 | Matsuda | ................. | G06F 3/017 345/473 |
| 2011/0316963 A1* | 12/2011 | Li | ................. | H04N 7/15 348/14.1 |
| 2012/0019627 A1* | 1/2012 | Choi | ................. | A47L 9/009 348/50 |
| 2012/0087580 A1 | 4/2012 | Woo et al. | | |
| 2012/0243743 A1 | 9/2012 | Pastor et al. | | |
| 2012/0284652 A1* | 11/2012 | Kuo | ................. | H04L 12/2827 715/760 |
| 2013/0166193 A1* | 6/2013 | Goldman | ................. | G01C 21/206 701/410 |
| 2013/0194304 A1* | 8/2013 | Latta | ................. | G09G 3/003 345/633 |
| 2013/0253818 A1 | 9/2013 | Sanders et al. | | |
| 2013/0281111 A1* | 10/2013 | Syrjarinne | ............. | H04W 64/00 455/456.1 |
| 2014/0028850 A1 | 1/2014 | Keating et al. | | |
| 2014/0139551 A1* | 5/2014 | McCulloch | ............ | G09G 5/377 345/633 |
| 2014/0267600 A1* | 9/2014 | Arcas | ................. | H04N 13/0011 348/42 |
| 2015/0049086 A1* | 2/2015 | Morato | ................. | G06T 15/04 345/427 |

* cited by examiner

ELECTRONIC DEVICE AND METHOD FOR PROVIDING MAP SERVICE

CLAIM OF PRIORITY

This application claims priority form and benefit under 35 U.S.C. § 119(a) of a Korean patent application filed in the Korean Intellectual Property Office on Nov. 24, 2014 and assigned Serial No. 10-2014-0164510, which is hereby incorporated by reference for all purposes if fully set forth herein.

TECHNICAL FIELD

Various embodiments of the present disclosure relate to an electronic device and method for creating a map by using images or providing various services by using the created map.

BACKGROUND

Electronic devices can offer a map service for a surrounding space. The electronic device receives map data from a map server to provide a topographical map or an indoor map for the surrounding space to users. A Wireless Fidelity (Wi-Fi) Positioning Service (WPS) provides an indoor position of an object in a surrounding space to the electronic device based on indoor positioning. The electronic device may provide a position of the object in relation to a two-dimensional (2D) map like the indoor map. The electronic device obtains an image of the surrounding space around the electronic device by using a camera mounted thereon. The electronic device sequentially obtains images of the surrounding space to give various visual effects based on the obtained images. The electronic device forms wired/wireless communication connection with external devices. The electronic device controls a function of the external device or exchanges various data with the external device, by using wired/wireless communication.

Conventionally, the map of the surrounding space is provided to the electronic device based on topographical data collected by a service provider providing the map service. Also for the indoor map, map data configured in the form of a plane view is provided from the service provider to the electronic device. The data may include architectural information for public institutions, infras (e.g., railways, subways, etc.), and so forth, but information about appearance of the surrounding space inside or outside a personal space (e.g., houses, companies, schools, etc.) and information about various objects existing in the surrounding space are not usually included in the data.

The above information is presented as background information only to assist with an understanding of the present disclosure. No determination has been made, and no assertion is made, as to whether any of the above might be applicable as prior art with regard to the present disclosure.

SUMMARY

Various aspects of the present disclosure are to provide an electronic device and method which effectively configures a three-dimensional (3D) map of a surrounding space around a user and expands a 3D map connection range by sharing or using configured 3D maps, thereby to provide a service for a map and objects of various surrounding spaces around the user.

Various aspects of the present disclosure are also to provide an electronic device and method which provides information about various objects appearing on a map or provides a service for controlling an object.

According to various embodiments of the present disclosure, there is provided an electronic device including a memory configured to store an image set and a map platform module which is functionally connected with the memory and is implemented with a processor. The map platform module is configured to obtain an image set comprising a plurality of images for a path on an external space surrounding the electronic device, to determine an area corresponding to an object included in the external space from at least one of the plurality of images, to obtain information about the object based on whether the object is capable of communication connection with the electronic device, and to display the information in association with the area through a display functionally connected with the electronic device.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

Throughout the drawings, it should be noted that like reference numbers are used to depict the same or similar elements, features, and structures, wherein.

Throughout the drawings, like reference numerals will be understood to refer to like parts, components, and structures.

DETAILED DESCRIPTION

Figure 1:
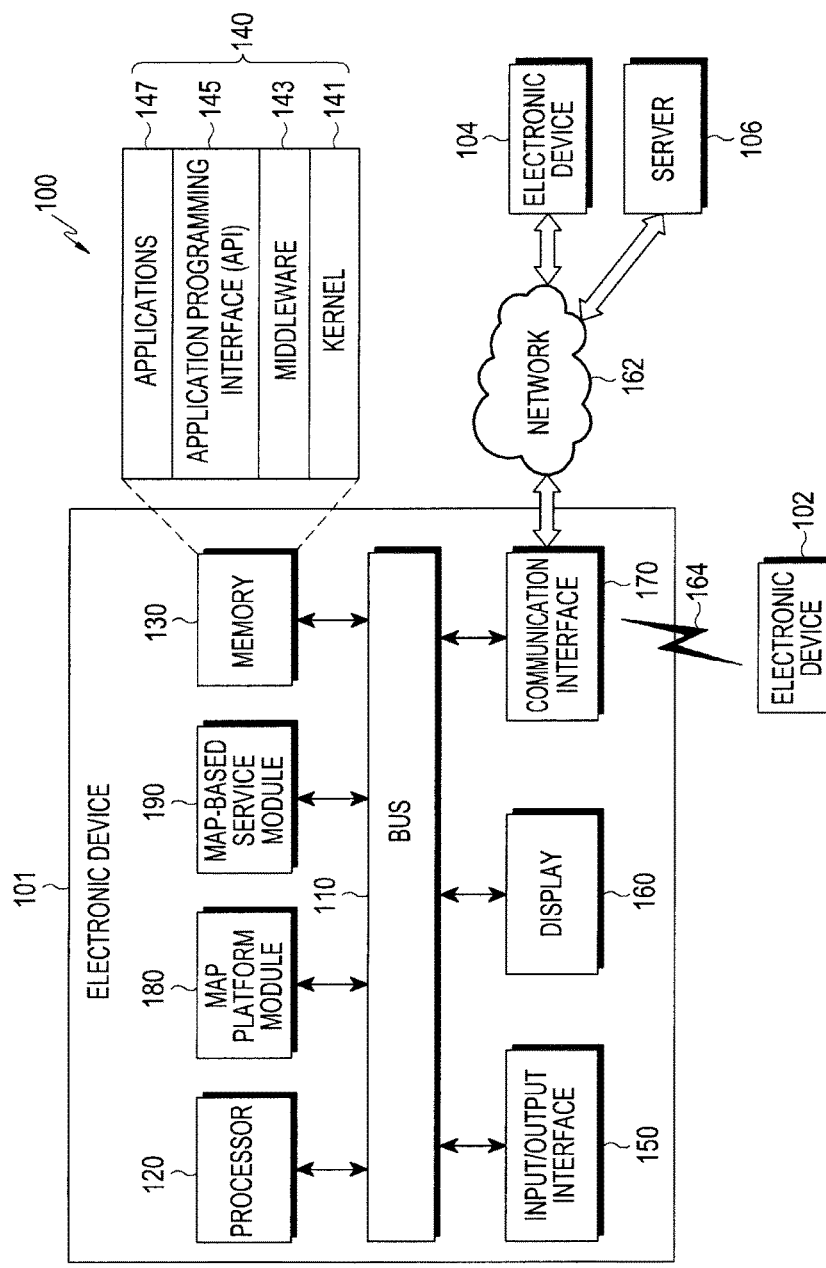
FIG. 1 illustrates a network environment including an electronic device according to various embodiments of the present disclosure.

Hereinafter, various embodiments of the present disclosure will be disclosed with reference to the accompanying drawings. However, the description is not intended to limit the present disclosure to particular embodiments, and it should be construed as including various modifications, equivalents, and/or alternatives according to the embodiments of the present disclosure. In regard to the description of the drawings, like reference numerals refer to like elements.

In the present disclosure, an expression such as "having," "may have," "comprising," or "may comprise" indicates existence of a corresponding characteristic (such as an element such as a numerical value, function, operation, or component) and does not exclude existence of additional characteristic.

In the present disclosure, an expression such as "A or B," "at least one of A or/and B," or "one or more of A or/and B" may include all possible combinations of together listed items. For example, "A or B," "at least one of A and B," or "one or more of A or B" may indicate the entire of (1) including at least one A, (2) including at least one B, or (3) including both at least one A and at least one B.

Expressions such as "first," "second," "primarily," or "secondary," used in various exemplary embodiments, may represent various elements regardless of order and/or importance and do not limit corresponding elements. The expressions may be used for distinguishing one element from another element. For example, a first user device and a second user device may represent different user devices regardless of order or importance. For example, a first element may be referred to as a second element without deviating from the scope of the present disclosure, and similarly, a second element may be referred to as a first element.

When it is described that an element (such as a first element) is "operatively or communicatively coupled" to or "connected" to another element (such as a second element), the element can be directly connected to the other element or can be connected to the other element through a third element. However, when it is described that an element (such as a first element) is "directly connected" or "directly coupled" to another element (such as a second element), it means that there is no intermediate element (such as a third element) between the element and the other element.

An expression "configured to (or set)" used in the present disclosure may be replaced with, for example, "suitable for," "having the capacity to," "designed to," "adapted to," "made to," or "capable of" according to a situation. A term "configured to (or set)" does not always mean only "specifically designed to" by hardware. Alternatively, in some situation, an expression "apparatus configured to" may mean that the apparatus "can" operate together with another apparatus or component. For example, a phrase "a processor configured (or set) to perform A, B, and C" may be a generic-purpose processor (such as a CPU or an application processor) that can perform a corresponding operation by executing at least one software program stored at an exclusive processor (such as an embedded processor) for performing a corresponding operation or at a memory device.

Terms defined in the present disclosure are used for only describing a specific exemplary embodiment and may not have an intention to limit the scope of other exemplary embodiments. When using in a description of the present disclosure and the appended claims, a singular form may include a plurality of forms unless it is explicitly differently represented. Entire terms including a technical term and a scientific term used here may have the same meaning as a meaning that may be generally understood by a person of common skill in the art. It may be analyzed that generally using terms defined in a dictionary have the same meaning as or a meaning similar to that of a context of related technology and are not analyzed as an ideal or excessively formal meaning unless explicitly defined. In some case, terms defined in the present disclosure cannot be analyzed to exclude the present exemplary embodiments.

An electronic device according to various embodiments of the present disclosure may be a device including a communication function. For example, the electronic device may include at least one of a smart phone, a tablet Personal Computer (PC), a mobile phone, a video phone, an electronic book (e-book) reader, a desktop PC, a laptop PC, a netbook computer, a Personal Digital Assistant (PDA), a Portable Multimedia Player (PMP), an MP3 player, mobile medical equipment, a camera, and a wearable device. According to an embodiment of the present disclosure, the wearable device may include at least one of an accessory type (e.g., a watch, a ring, a bracelet, an anklet, a necklace, glasses, a contact lens, or Head-Mounted Device (HMD)), a fabric or clothing-integrated type (e.g., an electronic cloth), a body-attached type (e.g., a skin pad or tattoo), and a body-implanted type (e.g., an implantable circuit).

According to some embodiments, the electronic device may be a home appliance. The home appliance may include, for example, at least one of a Television (TV), a Digital Video Disk (DVD) player, audio equipment, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, and an electronic frame.

According to another embodiment, the electronic device may include at least one of various medical equipment (e.g., various portable medical measurement systems, such as a blood sugar measurement device, a heartbeat measurement device, a blood pressure measurement device, or a body temperature measurement device, Magnetic Resonance Angiography (MRA), Magnetic Resonance Imaging (MRI), Computed Tomography (CT), an imaging device, or an ultrasonic device), a navigation system, a Global Positioning System (GPS) receiver, an Event Data Recorder (EDR), a Flight Data Recorder (FDR), a vehicle infotainment device, electronic equipment for ships (e.g., navigation system and gyro compass for ships), avionics, a security device, a vehicle head unit, an industrial or home robot, an Automatic Teller's Machine (ATM), a Point of Sales (POS), Internet of things (e.g., electric bulbs, various sensors, electricity or gas meters, sprinkler devices, fire alarm devices, thermostats, streetlights, toasters, exercise machines, hot-water tanks, heaters, boilers, etc.).

According to some embodiments, the electronic device may include a part of a furniture or building/structure, an electronic board, an electronic signature receiving device, a projector, and various measuring instruments (e.g., a water, electricity, gas, or electric wave measuring device). The electronic device according to various embodiments of the present disclosure may be one of the above-listed devices or a combination thereof. The electronic device according to various embodiments of the present disclosure may be a flexible device. It will be obvious to those of ordinary skill in the art that the electronic device according to various embodiments of the present disclosure is not limited to the above-listed devices and may include new electronic devices according to technical development.

Hereinafter, an electronic device according to various embodiments of the present disclosure will be described with reference to the accompanying drawings. Herein, the term "user" used in various embodiments of the present disclosure may refer to a person who uses the electronic device or a device using the electronic device (e.g., an artificial intelligence electronic device).

In addition, an artisan understands and appreciates that a "processor" or "microprocessor" constitute hardware in the claimed invention. Under the broadest reasonable interpretation, the appended claims constitute statutory subject matter in compliance with 35 U.S.C. § 101.

The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. § 101 and does not constitute software per se.

Referring to FIG. 1, a description will be made of an electronic device 101 in a network environment 100 according to various embodiments of the present disclosure. The electronic device 101 may include a bus 110, a processor 120, a memory 130, an Input/Output (I/O) interface 150, a display 160, a communication interface 170, a map platform module 180, and a map-based service module 190. According to some embodiments, the electronic device 101 may omit at least one of the foregoing elements or may further include other elements.

The bus 110 may include a circuit for interconnecting the elements 110 through 190 described above and for allowing communication (e.g., a control message and/or data) between the elements 110 through 190.

The processor 120 may include one or more of a Central Processing Unit (CPU), an Application Processor (AP), and a Communication Processor (CP). The processor 120 performs operations or data processing for control and/or communication of, for example, at least one other elements of the electronic device 101.

The memory 130 may include a volatile and/or nonvolatile memory. The memory 130 may store, for example, commands or data associated with at least one other elements of the electronic device 101. According to an embodiment of the present disclosure, the memory 130 may store software and/or a program 140. The program 140 may include, for example, a kernel 141, middleware 143, an Application Programming Interface (API) 145, and/or an application program (or an application) 147. At least some of the kernel 141, the middleware 143, and the API 145 may be referred to as an Operating System (OS).

The kernel 141 controls or manages, for example, system resources (e.g., the bus 110, the processor 120, or the memory 130) used to execute an operation or a function implemented in other programs (e.g., the middleware 143, the API 145, or the application program 147). The kernel 141 provides an interface through which the middleware 143, the API 145, or the application program 147 accesses separate components of the electronic device 101 to control or manage the system resources.

The middleware 143 may work as an intermediary for allowing, for example, the API 145 or the application program 147 to exchange data in communication with the kernel 141.

In regard to one or more task requests received from the application program 147, the middleware 143 may process them according to priorities. For example, the middleware 143 may give priorities for using a system resource (e.g., the bus 110, the processor 120, or the memory 130) of the electronic device 101 to at least one of the application programs 147. In more details, the middleware 143 may perform scheduling or load balancing with respect to the one or more task requests by processing the one or more task requests according to a priority given to the at least one application program 147.

The API 145 is an interface used for the application 147 to control a function provided by the kernel 141 or the middleware 143, and may include, for example, at least one interface or function (e.g., a command) for file control, window control, image processing or character control.

The I/O interface 150 serves as an interface for delivering a command or data input from a user or another external device to other element(s) 110 through 190 of the electronic device 101. The I/O interface 150 may also output a command or data received from other element(s) 110 through 190 of the electronic device 101 to a user or another external device.

The display 160 may include, for example, a Liquid Crystal Display (LCD), a Light Emitting Diode (LED) display, an Organic Light Emitting Diode (OLED) display, a MicroElectroMechanical System (MEMS) display, or an electronic paper display. The display 160 may display various contents (e.g., a text, an image, video, an icon, or a symbol) to users. The display 160 may include a touch screen, and receives a touch, a gesture, proximity, or a hovering input, for example, by using an electronic pen or a part of a body of a user.

The communication interface 170 sets up communication, for example, between the electronic device 101 and an external device (e.g., a first external electronic device 102, a second external electronic device 104, or a server 106). For example, the communication interface 170 is connected to a network 162 through wireless or wired communication to communicate with the external device (e.g., the second external electronic device 104 or the server 106).

The wireless communication may use, as a cellular communication protocol, for example, at least one of Long Term Evolution (LTE), LTE-Advanced (LTE-A), Code Division Multiple Access (CDMA), Wideband CDMA (WCDMA), a Universal Mobile Telecommunication System (UMTS), Wireless Broadband (WiBro), or Global System for Mobile Communications (GSM)). The wireless communication may include, for example, short-range communication 164. The short-range communication 164 may include, for example, at least one of Wireless-Fidelity (Wi-Fi), Bluetooth, Near Field Communication (NFC), and a Global Positioning System (GPS). The wired communication may include, for example, at least one of a USB (universal serial bus), a High Definition Multimedia Interface (HDMI), a Recommended Standard (RS)-232, and a Plain Old Telephone Service (POTS). The network 162 may include a telecommunications network, for example, at least one of a computer network (e.g., a Local Area Network (LAN) or a Wide Area Network (WAN)), Internet, and a telephone network.

A map platform module 180 obtains information (e.g., an image) related to a space, a path, a point, or an object outside an electronic device from, for example, an external electronic device (e.g., the first external electronic device 102, the second external electronic device 104, or the server 106) or another element (e.g., the memory 130 or the sensor) inside the electronic device to perform a series of processing, such as creating, editing, and converting a map or interworking the map with an object outside the electronic device, based on the obtained information.

A map-based service module 190 obtains a map related to a space, a path, a point, or an object outside an electronic device from, for example, an external electronic device (e.g., the first external electronic device 102, the second external electronic device 104, or the server 106) or another element (e.g., the memory 130) inside the electronic device to offer various services to a user of the electronic device 101 or an external electronic device (e.g., the first external electronic device 102 or the second external electronic device 104), based on the obtained map.

Although the map platform module 180 and the map-based service module 190 are illustrated as elements independent of the processor 120 and the memory 130 in FIG. 1, various embodiments are not limited to this illustration. At least some of the map platform module 180 and the map-based service module 190 may be integrated with, for example, the processor 120, or may be stored in the memory 130 in the form of software and executed in the processor 120. The map platform module 180 and the map-based service module 190 may be implemented in a manner distributed over the processor 120 and the memory 130. Although the map platform module 180 and the map-based service module 190 are illustrated as independent elements, they may be implemented with a single integrated module. Other embodiments are also possible. Additional information regarding the map platform module 180 and the map-based service module 190 is provided in association with FIG. 4.

Each of the first external electronic device 102 and the second external electronic device 104 may be a device of the same type as or a different type than the electronic device 101. According to an embodiment of the present disclosure, the server 106 may include a group of one or more servers. According to various embodiments, all or some of operations performed in the electronic device 101 may be performed in another electronic device or a plurality of electronic devices (e.g., the electronic devices 102 and 104 or the server 106). According to an embodiment of the present disclosure, when the electronic device 101 has to perform a function or a service automatically or at the request, the electronic device 101 may request another device (e.g., the electronic devices 102 and 104 or the server 106) to perform at least some functions associated with the function or the service instead of or in addition to executing the function or the service. The other electronic device (e.g., the electronic devices 102 and 104 or the server 106) may perform the requested function or an additional function and delivers the result to the electronic device 101. The electronic device 101 provides the received result or provides the requested function or service by processing the received result. To this end, for example, cloud computing, distributed computing, or client-server computing may be used.

Figure 2:
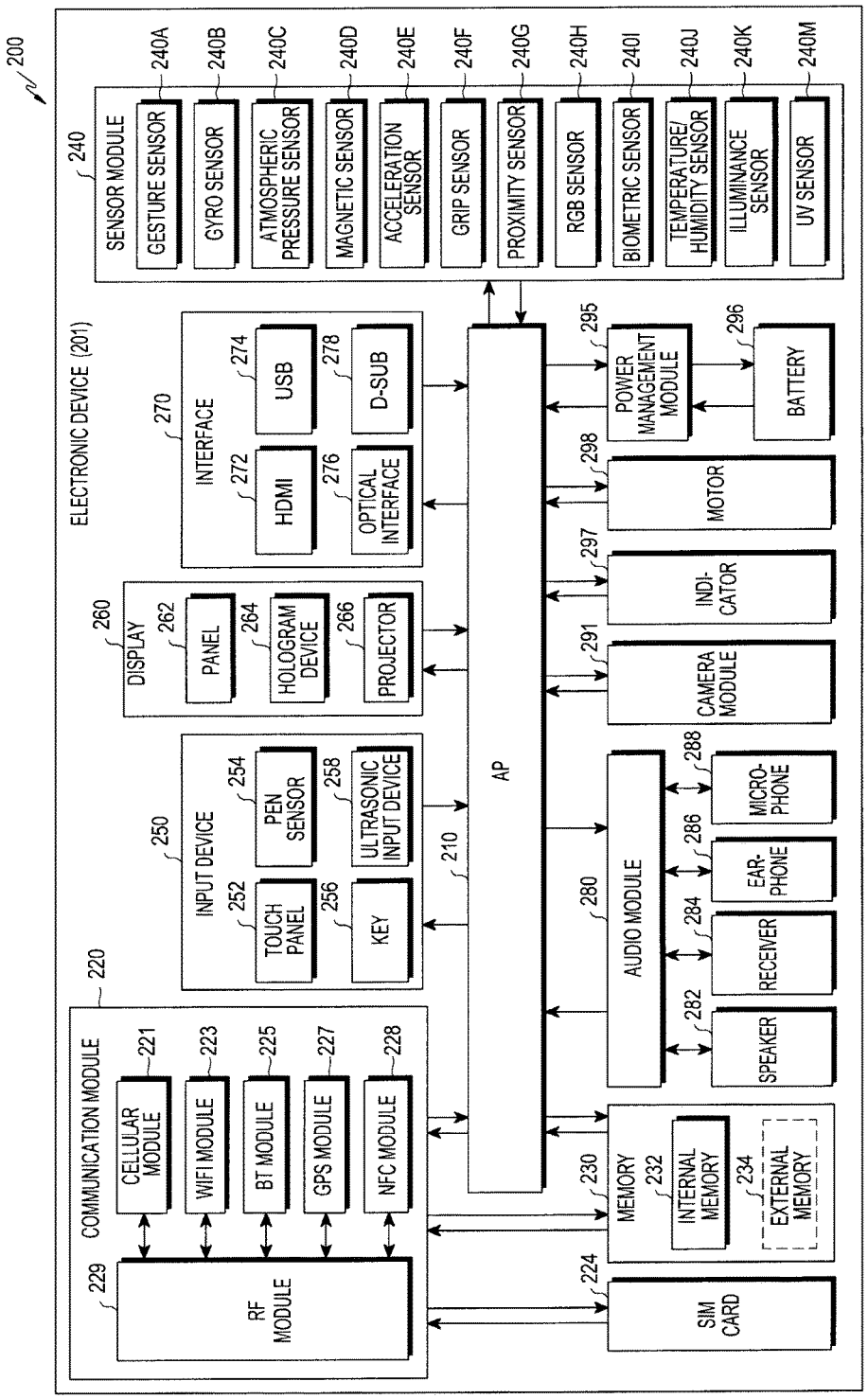
FIG. 2 is a block diagram of an electronic device according to various embodiments of the present disclosure.

FIG. 2 is a block diagram of an electronic device 201 according to various embodiments of the present disclosure.

Referring to FIG. 2, an electronic device 201 may form the entire electronic device 101 illustrated in FIG. 1 or a part of the electronic device 101 illustrated in FIG. 1. The electronic device 201 may include one or more Application Processors (APs) 210, a communication module 220, a Subscriber Identification Module (SIM) module 224, a memory 230, a sensor module 240, an input module 250, a display 260, an interface 270, an audio module 280, a camera module 291, a power management module 295, a battery 296, an indicator 297, and a motor 298.

The processor 210 controls multiple hardware or software components connected to the processor 210 by driving an Operating System (OS) or an application program, and performing processing and operations with respect to various data including multimedia data. The processor 210 may be implemented with, for example, a System on Chip (SoC). According to an embodiment, the processor 210 may further include a Graphic Processing Unit (GPU) and/or an image signal processor. The processor 210 may include at least some of the elements illustrated in FIG. 2 (e.g., the cellular module 221). The processor 210 loads a command or data received from at least one of other elements (e.g., a non-volatile memory) into a volatile memory, processes the command or data and stores various data in the non-volatile memory.

The communication module 220 may have a configuration that is the same as or similar to the communication interface 170 illustrated in FIG. 1. The communication module 220 may include, for example, the cellular module 221, a WiFi module 223, a Bluetooth (BT) module 225, a Global Positioning System (GPS) module 227, a Near Field Communication (NFC) module 228, and a Radio Frequency (RF) module 229.

The cellular module 221 may provide, for example, a voice call, a video call, a text service, or an Internet service over a communication network. According to an embodiment, the cellular module 221 may identify and authenticate the electronic device 201 in a communication network by using a subscriber identification module (e.g., the SIM module 224). According to an embodiment, the cellular module 221 performs at least one of functions that may be provided by the processor 210. According to an embodiment, the cellular module 221 may include a Communication Processor (CP).

Each of the WiFi module 223, the BT module 225, the GPS module 227, and the NFC module 228 may include a processor for processing data transmitted and received by a corresponding module. According to some embodiment, at least some (e.g., two or more) of the cellular module 221, the WiFi module 223, the BT module 225, the GPS module 227, and the NFC module 228 may be included in one Integrated Chip (IC) or IC package.

The RF module 229 may transmit and receive a communication signal (e.g., an RF signal). The RF module 229 may include a transceiver, a Power Amp Module (PAM), a frequency filter, a Low Noise Amplifier (LNA), or an antenna. According to another embodiment, at least one of the cellular module 221, the WiFi module 223, the BT module 225, the GPS module 227, and the NFC module 228 may transmit and receive an RF signal through a separate RF module.

The SIM module 224 may include a card including an SIM and/or an embedded SIM, and may include unique identification information (e.g., an Integrated Circuit Card Identifier (ICCID) or subscriber information (e.g., an International Mobile Subscriber Identity (IMSI)).

The memory 230 (e.g., the memory 130) may include an internal memory 232 or an external memory 234. The internal memory 232 may include at least one of a volatile memory (e.g., Dynamic Random Access Memory (DRAM), Static RAM (SRAM), Synchronous Dynamic RAM (SDRAM), and a non-volatile memory (e.g., One Time Programmable Read Only Memory (OTPROM), Programmable ROM (PROM), Erasable and Programmable ROM (EPROM), Electrically Erasable and Programmable ROM (EEPROM), mask ROM, flash ROM, NAND flash memory, or NOR flash memory), and a Solid State Drive (SSD).

The external memory 234 may further include flash drive, for example, Compact Flash (CF), Secure Digital (SD), micro-SD, mini-SD, extreme Digital (xD), a Multi-Media Card (MMC), or a memory stick. The external memory 234 may be functionally and/or physically connected with the electronic device 201 through various interfaces.

The sensor module 240 measures physical quantity or senses an operation state of the electronic device 201 to convert the measured or sensed information into an electric signal. The sensor module 240 may include at least one of a gesture sensor 240A, a gyro sensor 240B, a pressure sensor 240C, a magnetic sensor 240D, an acceleration sensor 240E, a grip sensor 240F, an atmospheric proximity sensor 240G, a color sensor 240H (e.g., RGB sensor), a biometric sensor 240I, a temperature/humidity sensor 240J, an illumination sensor 240K, and a Ultraviolet (UV) sensor 240M. Additionally or alternatively, the sensor module 240 may include an E-nose sensor (not shown), an Electromyography (EMG) sensor (not shown), an Electroencephalogram (EEG) sensor (not shown), an Electrocardiogram (ECG) sensor (not shown), or a fingerprint sensor. The sensor module 240 may further include a control circuit for controlling at least one sensor included therein. In some embodiment, the electronic device 201 may further include a processor configured to control the sensor module 240 as part of or separately from the processor 210, to control the sensor module 240 during a sleep state of the processor 210.

The input module 250 may include a touch panel 252, a (digital) pen sensor 254, a key 256, or an ultrasonic input device 258. The touch panel 252 may use at least one of a capacitive type, a resistive type, an IR type, or an ultrasonic type. The touch panel 252 may further include a control circuit. The touch panel 252 may further include a tactile layer to provide tactile reaction to the user.

The (digital) pen sensor 254 may include a recognition sheet which is a part of the touch panel 252 or a separate recognition sheet. The key 256 may also include a physical button, an optical key, or a keypad. The ultrasonic input device 258 senses ultrasonic waves generated in an input means through a microphone (e.g., the microphone 288) and checks data corresponding to the sensed ultrasonic waves.

The display 260 (e.g., the display 160) may include a panel 262, a hologram 264, or a projector 266. The panel 262 may have a configuration that is the same as or similar to that of the display 160 of FIG. 1. The panel 262 may be implemented to be flexible, transparent, or wearable. The panel 262 may be configured with the touch panel 252 in one module. The hologram 264 shows a stereoscopic image in the air by using interference of light. The projector 266 displays an image onto an external screen through projection of light. The screen may be positioned inside or outside the electronic device 201. According to an embodiment, the display 260 may further include a control circuit for controlling the panel 262, the hologram 264, or the projector 266.

The interface 270 may include a High-Definition Multimedia Interface (HDMI) 272, a Universal Serial Bus (USB) 274, an optical interface 276, or a D-subminiature 278. The interface 270 may be included in the communication interface 170 illustrated in FIG. 1. Additionally or alternatively, the interface 270 may include a Mobile High-Definition Link (MHL) interface, an SD/Multi-Media Card (MMC) interface, or an Infrared Data Association (IrDA) interface.

The audio module 280 bi-directionally converts sound and an electric signal. At least one element of the audio module 280 may be included in the input/output interface 150 illustrated in FIG. 1. The audio module 280 processes sound information input or output through the speaker 282, the receiver 284, the earphone 286, or the microphone 288.

The camera module 291 is a device capable of capturing a still image or a moving image, and according to an embodiment, may include one or more image sensors (e.g., a front sensor or a rear sensor), a lens, an Image Signal Processor (ISP), or a flash (e.g., an LED or a xenon lamp).

The power management module 295 manages power of the electronic device 201. According to an embodiment, the power management module 295 may include a Power Management Integrated Circuit (PMIC), a charger IC, or a battery fuel gauge. The PMIC may have a wired and/or wireless charging scheme. The wireless charging scheme includes a magnetic-resonance type, a magnetic induction type, and an electromagnetic type, and for wireless charging, an additional circuit, for example, a coil loop, a resonance circuit, or a rectifier may be further included. The battery gauge measures the remaining capacity of the battery 296 or the voltage, current, or temperature of the battery 296 during charging. The battery 296 may include a rechargeable battery and/or a solar battery.

The indicator 297 displays a particular state, for example, a booting state, a message state, or a charging state, of the electronic device 201 or a part thereof (e.g., the processor 210). The motor 298 converts an electric signal into mechanical vibration or generates vibration or a haptic effect. Although not shown, the electronic device 201 may include a processing device (e.g., a GPU) for supporting a mobile TV. The processing device for supporting the mobile TV processes media data according to, a standard such as Digital Multimedia Broadcasting (DMB), Digital Video Broadcasting (DVB), or mediaFlo™.

Each of the foregoing elements described herein may include one or more components, and a name of the part may vary with a type of the electronic device 201. The electronic device according to the present disclosure may include at least one of the foregoing elements, and some of the elements may be omitted therefrom or other elements may be further included therein. As some of the elements of the electronic device according to the present disclosure are coupled into one entity, thereby performing the same function as those of the elements that have not been coupled.

Figure 3:
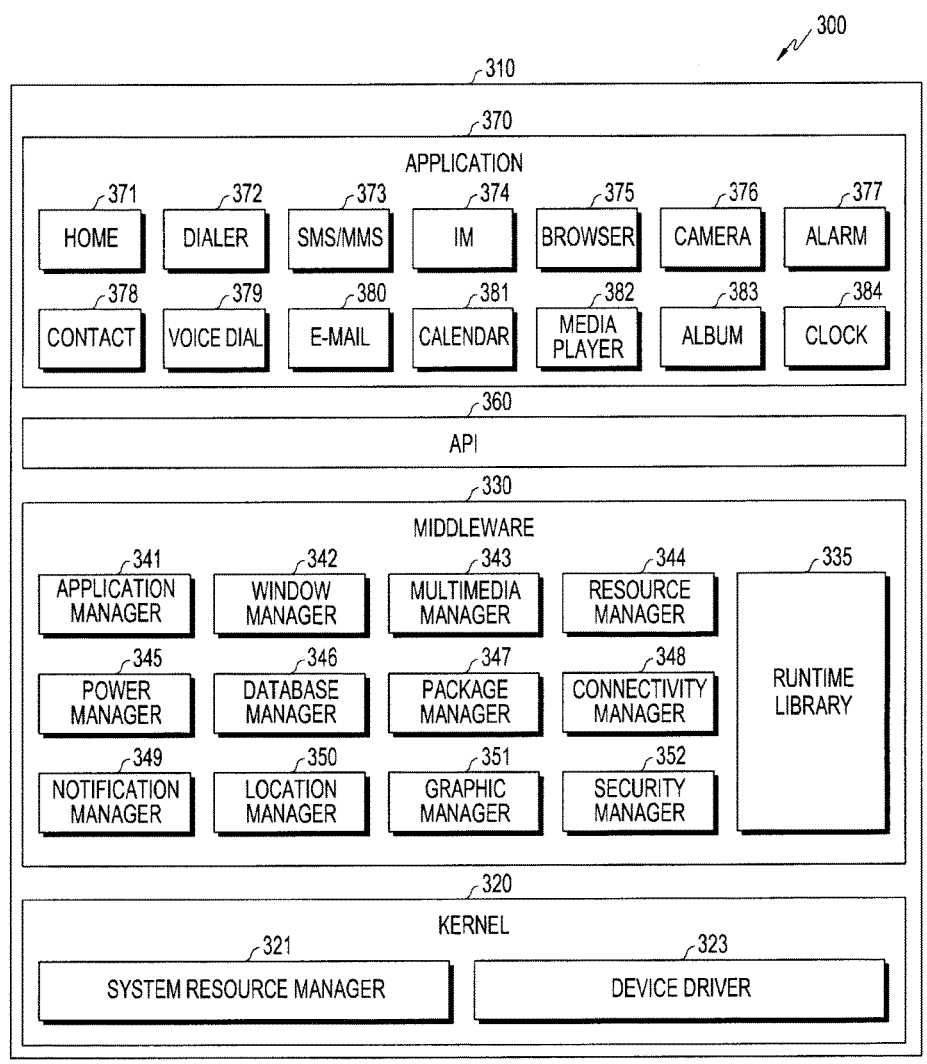
FIG. 3 is a block diagram of a program module according to various embodiments of the present disclosure.

FIG. 3 is a block diagram of a programming module according to various embodiments of the present disclosure. According to an embodiment, a programming module 310 (e.g., the program 140) may include an Operation System (OS) for controlling resources associated with an electronic device (e.g., the electronic device 101) and/or various applications executed on the OS. The OS may include Android, iOS, Windows, Symbian, Tizen, or Bada.

The programming module 310 may include a kernel 320, a middleware 330, an application programming interface (API) 360, and/or an application 370. At least a part of the programming module 310 may be preloaded on an electronic device or may be downloaded from an external electronic device (e.g., the electronic devices 102 and 104, or the server 106).

The kernel 320 (e.g., the kernel 141) may include a system resource manager 321 and/or a device driver 323. The system resource manager 321 may perform control, allocation, or retrieval of system resources. According to an embodiment, the system resource manager 321 may include a process management unit, a memory management unit, or a file system. The device driver 323 may include, for example, a display driver, a camera driver, a Bluetooth driver, a shared memory driver, a USB driver, a keypad driver, a WiFi driver, an audio driver, or an Inter-Process Communication (IPC) driver.

The middleware 330 may provide functions that the application 370 commonly requires or provide various functions to the application 370 through the API 360 to allow the application 370 to efficiently use a limited system resource in an electronic device. According to an embodiment, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses to add a new function through a programming language while the application 370 is executed. The runtime library 335 performs functions relating to an input/output, memory management, or calculation operation.

The application manager 341 manages a life cycle of at least one application among the applications 370. The window manager 342 manages a GUI resource using a screen. The multimedia manager 343 recognizes a format necessary for playing various media files and performs encoding or decoding on a media file by using a codec appropriate for a corresponding format. The resource manager 344 manages a resource such as source code, memory, or storage space of at least one application among the applications 370.

The power manager 345 manages a battery or power in operation with a basic input/output system (BIOS) and provides power information necessary for an operation of the electronic device. The database manager 346 performs a management operation to generate, search or change a database used for at least one application among the applications 370. The package manager 347 manages the installation or update of an application distributed in a package file format.

The connectivity manager 348 manages a wireless connection such as a WiFi or Bluetooth connection. The notification manager 349 displays or notifies events such as arrival messages, appointments, and proximity alerts in a manner that is not disruptive to a user. The location manager 350 manages location information of an electronic device. The graphic manager 351 manages a graphic effect to be provided to a user or a User Interface (UI) related thereto. The security manager 352 provides a general security function necessary for system security or user authentication. According to an embodiment of the present disclosure, when an electronic device (e.g., the electronic device 101) has a call function, the middleware 330 may further include a telephony manager for managing a voice or video call function of the electronic device.

The middleware 330 may include a middleware module forming a combination of various functions of the above-mentioned internal elements. The middleware 330 may provide modules specified according to types of OS so as to provide distinctive functions. Additionally, the middleware 330 may delete some of existing elements or add new elements dynamically.

The API 360 (e.g., the API 145) may be provided as a set of API programming functions with a different configuration according to the OS. In the case of Android or iOS, for example, one API set may be provided by each platform, and in the case of Tizen, two or more API sets may be provided.

The application 370 (e.g., the application program 147) may include one or more applications capable of providing a function, for example, a home application 371, a dialer application 372, a Short Messaging Service/Multimedia Messaging Service (SMS/MMS) application 373, an Instant Message (IM) application 374, a browser application 375, a camera application 376, an alarm application 377, a contact application 378, a voice dial application 379, an e-mail application 380, a calendar application 381, a media player application 382, an album application 383, a clock application 384, a health care application (e.g., an application for measuring an exercise amount or a blood sugar), or an environment information providing application (e.g., an application for providing air pressure, humidity, or temperature information).

According to an embodiment of the present disclosure, the application 370 may include an application (hereinafter, an "information exchange application" for convenience) supporting information exchange between the electronic device (e.g., the electronic device 101) and an external electronic device (e.g., the electronic device 102 or 104). The information exchange application may include, for example, a notification relay application for transferring specific information to the external electronic device or a device management application for managing the external electronic device.

For example, the notification relay application may include a function for transferring notification information generated in another application (e.g., an SMS/MMS application, an e-mail application, a health care application, or an environment information application) of the electronic device to an external electronic device (e.g., the electronic device 102 or 104). The notification relay application may receive notification information from an external electronic device to provide the same to a user. The device management application may manage (e.g., install, remove, or update) at least one function (e.g., turn on/turn off of an external electronic device itself (or a part thereof) or control of brightness (or resolution) of a display, a service provided by an application operating in an external electronic device or provided by the external electronic device (e.g., a call service or a message service).

According to an embodiment, the application 370 may include an application (e.g., a health care application of mobile medical equipment) designated according to an attribute of the external electronic device (e.g., the electronic device 102 or 104). According to an embodiment, the application 370 may include an application received from the external electronic device (e.g., the server 106 or the electronic device 102 or 104). According to an embodiment, the application 370 may include a preloaded application or a third party application that may be downloaded from the server. Names of elements of the programming module 310 according to the illustrated embodiment may vary depending on a type of an OS.

According to various embodiments, at least a part of the programming module 310 may be implemented by software, firmware, hardware, or a combination of at least two of them. The at least a part of the programming module 310 may be implemented (e.g., executed) by a processor (e.g., the processor 210). The at least a part of the programming module 310 may include a module, a program, a routine, sets of instructions, or a process for performing one or more functions.

A term "module" used herein may mean, for example, a unit including one of or a combination of two or more of hardware, software, and firmware. The "module" may be interchangeably used with a unit, a logic, a logical block, a component, or a circuit. The "module" may be a minimum unit or a portion of an integrated component. The "module" may be a minimum unit or a portion thereof performing one or more functions. The "module" may be implemented mechanically or electronically. For example, the "module" according to the embodiments may include at least one of an application-specific integrated circuit (ASIC) chip, field-programmable gate arrays (FPGAs), and a programmable-logic device performing certain operations already known or to be developed.

Figure 4:
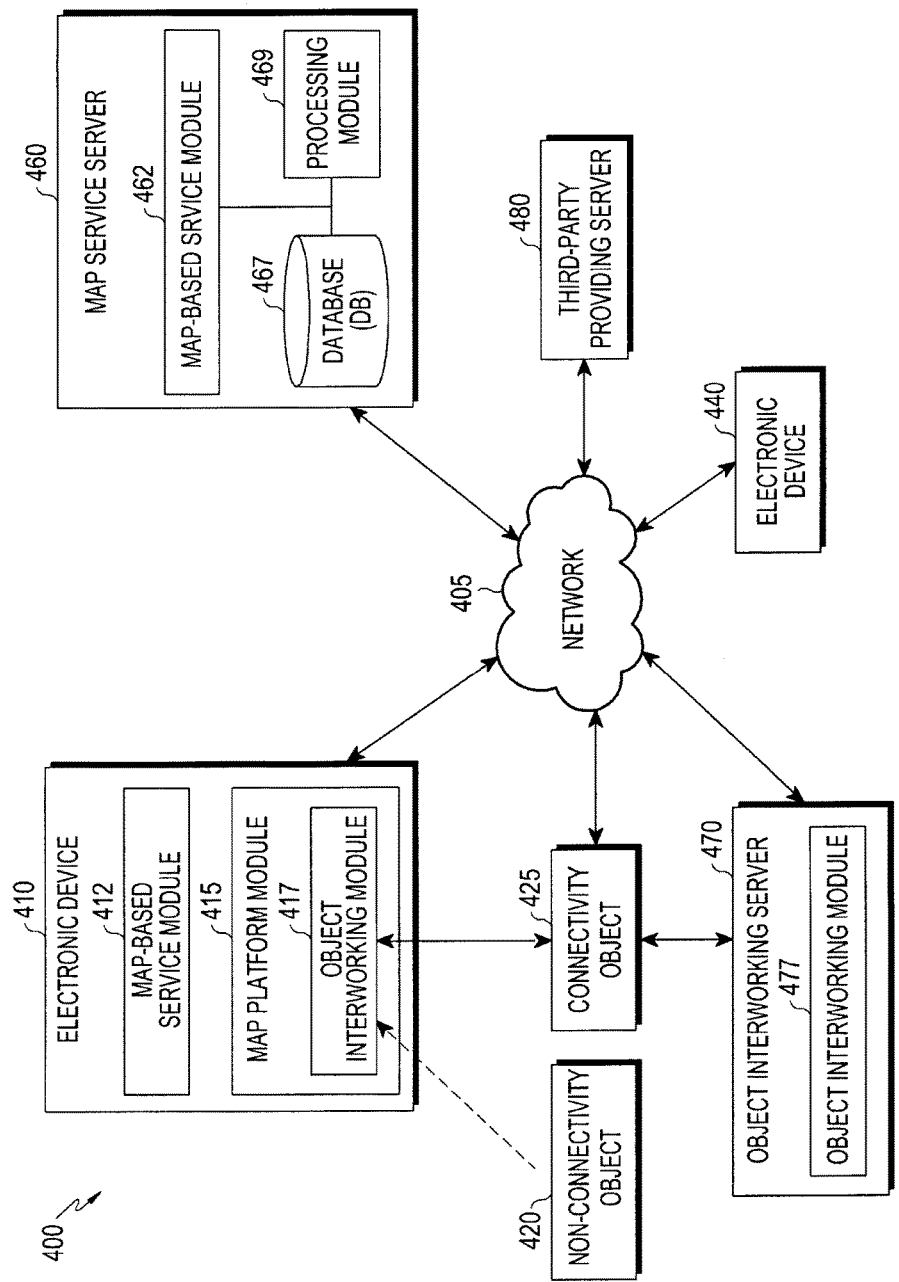
FIG. 4 illustrates a network-based map information system according to various embodiments of the present disclosure.

FIG. 4 illustrates a network-based map information system 400 according to various embodiments of the present disclosure. Referring to FIG. 4, the map information system 400 according to various embodiments of the present disclosure may include an electronic device 410, another electronic device 440, a map service server 460, an object interworking server 470, and a third-party providing server 480 which are connected to one another over a network 405.

The electronic device 410 (e.g., the electronic device 1011) according to various embodiments of the present disclosure may include a map platform module 415 and a map-based service module 412. The map platform module 415 may perform various processing (e.g., creation, edition, display, and conversion of a 3D map or interworking between a 3D map and an object) with respect to, for example, a 3D map related to a space, a path, a point, or an object outside the electronic device. The map platform module 415 provides various processing results with respect to the 3D map to another module (e.g., the map-based service module 412) or an external device (e.g., the electronic device 440 or the map service server 460). The map-based service module 412 provides various services (e.g., a 3D map editing or synthesizing service, a 3D map sharing service, a 3D map-based object service, etc.) based on 3D maps created or processed by the map platform module 415.

According to an embodiment, the electronic device 410 may obtain data and information necessary for performing a map-related function (e.g., a 3D map processing function provided by the map platform module 415 and/or a 3D map-based service providing function provided by the map-based service module 412) from an external device (e.g., the map service server 460, the object interworking server 470, the another electronic device 440, etc.). The electronic device is provided with at least some of computing resources necessary for performing a map-related function through an external device (e.g., the map service server 460, the object interworking server 470, the other electronic device 440, etc.). For example, at least some of the map platform module 415 and/or the map-based service module 412 may be implemented by the external device (e.g., the map service server 460, the object interworking server 470, the other electronic device 440, etc.).

The map platform module 415 according to various embodiments of the present disclosure may include an object interworking module 417. The map platform module 415 may interwork a 3D map with an object outside the electronic device (e.g., a connectivity object 425, a non-connectivity object 420, etc.) through the object interworking module 417, for example, in a process of executing processing with respect to the 3D map.

The object interworking module 417 according to various embodiments of the present disclosure associates at least some areas of at least one images included in the 3D map with an object. The object interworking module 417 analyzes an image included in the 3D map to identify an area corresponding to the object. The object interworking module 417 interworks at least one of the connectivity object 425 and the non-connectivity object 420 with the identified area.

According to an embodiment of the present disclosure, the object interworking module 417 performs a discovery operation through a communication module to interwork the identified area with the connectivity object 425. The object interworking module 417 determines the connectable connectivity object 425 around the electronic device 410 or an external device (e.g., the object interworking server 470 etc.) that is to receive information for connection with the connectivity object 425, for example, based on a discovery result. The object interworking module 417 obtains information necessary for forming connection from at least one external device (e.g., the connectivity object 425, the object interworking server 470, etc.) based on the determination.

According to an embodiment of the present disclosure, the object interworking module 417 obtains information about the non-connectivity object 420 from the user to interwork the identified area with the non-connectivity object 420. The object interworking module 417 obtains the information about the non-connectivity object 420 from an external device through the network 405. The object interworking module 417 associates the obtained information about the non-connectivity object 420 with an area corresponding to the non-connectivity object 420 in the 3D map.

The connectivity object 425 according to various embodiments of the present disclosure directly communicates with the electronic device 410 through a communication module or indirectly communicates with the electronic device 410 through the network 405 or the object interworking server 470. For example, the connectivity object 425 may include an electronic product (e.g., a laptop computer, a cellular phone, a cleaning robot, a smart washing machine, a smart refrigerator, etc.) including the communication module.

The non-connectivity object 420 according to various embodiments of the present disclosure may include an electronic product (e.g., a common refrigerator) or a non-electronic product (e.g., a carpet, a table, etc.) that does not include the communication module. The non-connectivity object 420 may include an object determined to be inconnectable among the connectivity objects 425. For example, the non-connectivity object 420 may include the connectivity object 425 that has a temporary failure in a communication function, undergoes power interruption, or has an inactive communication function.

The map-based service module 412 (or a map-based service module 462) according to various embodiments of the present disclosure may provide various services based on a 3D map. The various services may include at least one of a smart home service, a guide service, an education service, a shopping service, a moving service, a game service, a 3D indoor map navigation service, an object control service, an object simulation service, an object monitoring service, a Social Network Service (SNS) service, a map inquiry service, an indoor positioning service, an Internet of Things (IoT) device control service, an object data service, and a map synthesizing service.

The map service server 460 may include the map-based service module 462. The map-based service module 462 of the map service server 460 may correspond to, for example, the map-based service module 412 of the electronic device 410. The map-based service module 462 of the map service server 460 may provide at least some of services offered by the map-based service module 412 of the electronic device 410 or may additionally offer other services. The map-based service modules 412 and 462 may provide different qualities for the same service, depending on a type or an amount of accessible data.

The object interworking server 470 may include, for example, an object interworking module 477. The object interworking module 477 of the object interworking server 470 may correspond to, for example, the object interworking module 417 of the electronic device 410. The object interworking module 477 of the object interworking server 470 may provide, for example, at least some of services provided by the object interworking module 417 included in the electronic device 410, or may additionally offer other services. The object interworking modules 417 and 477 may provide different qualities of service for the same object, depending on a connection scheme, a connection state, and a type or an amount of accessible data. According to a type of the obtained information about an object or whether or not the information has been obtained, any one of the object interworking modules 417 and 477 requests or receives the information from the other object interworking module.

The map service server 460 according to various embodiments of the present disclosure may include, for example, the map-based service module 462, a DataBase (DB) 467, and a processing module 469. The map service server 460 receives a request for a 3D map-based service from another element (e.g., the electronic device 410) of the map information system 400, and transmits a processing result of the map-based service module 462 in response to the request.

The map service server 460 according to various embodiments of the present disclosure may include at least some of elements of a map platform module (e.g., the map platform module 415). The map service server 460 performs at least a part of 3D map processing (e.g., creation, display, edition, and conversion of the 3D map or interworking between the object and the map) by using the processing module 469.

The map-based service module 462 processes the 3D map-based service in response to the request for the service, transmitted to the map service server 460 from an external device (e.g., the electronic device 410). For example, the map-based service module 462 may process data retrieved from the DB 467 in relation to the service through the processing module 469. For example, the map-based service module 462 may transmit the processing result to the external device or another external device. The DB 467 stores data and information about the 3D map and stores data and information related to providing of the 3D map-based service. The processing module 469 processes the 3D map and performs processing for the 3D map-based service. The map service server 460 provides a computation capability necessary for processing the 3D map to another element (e.g., the electronic device 410) of the map information system 400 through the processing module 469.

The object interworking server 470 according to various embodiments of the present disclosure stores data or information about an object (e.g., the non-connectivity object 420 or the connectivity object 425). In response to a request for the data or information about the object (e.g., identification information, connection information, control information, operation record data, or simulation information), received from another element (e.g., the electronic device 410, the another electronic device 440, the map service server 460, or the third-party providing server 480) of the map information system 400, the object interworking server 470 may transmit the data or the information to the another element. For example, in response to a request for web Uniform Resource Locator (URL) information having a control interface for an object from another element of the map information system 400, the URL information may be transmitted.

According to an embodiment of the present disclosure, the object interworking server 470 forms connection with a connectivity object. The object interworking server 470 is connected with the object through wired/wireless communication. For example, the object interworking server 470 may receive a control command for the connectivity object from the electronic device 410 and send a control signal to the object.

According to an embodiment of the present disclosure, the object interworking server 470 may provide an interface based on the control information of the object. For example, the object interworking server 470 may provide an interface for controlling a function of the object in the form of a URL through the web. The object interworking server 470 maps the function of the object to a corresponding URL. The object interworking server 470 sends a control signal for the function corresponding to the URL to the object in response to a request for the URL.

A module (e.g., the map-based service module 412, the map platform module 415, etc.) according to various embodiments of the present disclosure may store data (e.g., information or an image set related to a virtual point generated by performing various processing in a variety of external devices (e.g., the another electronic device 440 (e.g., a smart phone, a wearable device, a robot, etc.), the third-party providing server 480, or the object interworking server 470), depending on characteristics of the data or characteristics of a service using the data. For example, an image captured by a smart home appliance including a camera (e.g., a cleaning robot, etc.) may be stored in the object interworking server 470. An image set shared using an SNS service may be stored in the third-party providing server 480 (e.g., an SNS service providing server, etc.).

A module according to various embodiments of the present disclosure (e.g., the map-based service modules 412 and 462, the map platform module 415, etc.) may transmit/ receive data to/from other elements of the electronic device (e.g., the processor 120, the memory 130, the display 160, etc.) through a bus of the electronic device 410 (e.g., the electronic device 1011). At least a part of the module may be implemented with software or hardware in the electronic device. A part of the module may be implemented in an external device (e.g., the electronic device 102, the electronic device 104, the server 106, etc.), such that the electronic device 410 may send a processing request to the external device or receive a processing result from the external device.

Figure 5:
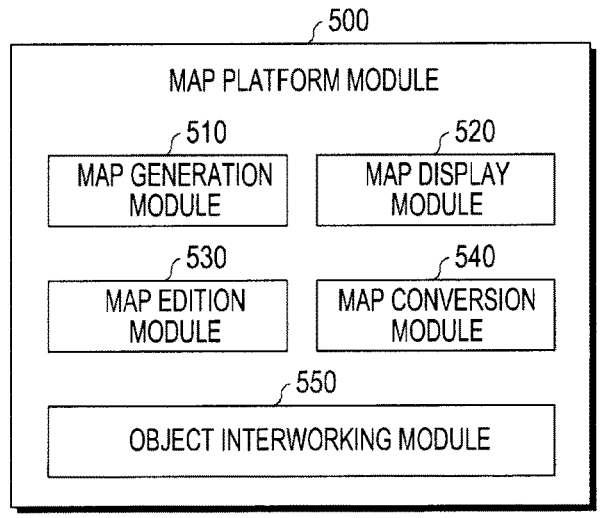
FIG. 5 is a block diagram of a map platform module according to various embodiments of the present disclosure.

FIG. 5 is a block diagram of a map platform module 500 according to various embodiments of the present disclosure.

The map platform module 500 according to various embodiments of the present disclosure may perform processing including at least one of creating, displaying, editing, converting, or synthesizing a map (e.g., a 3D map), and interworking an object with the map, based on various data obtained from the electronic device. Referring to FIG. 5, the map platform module 500 according to various embodiments of the present disclosure may include at least one of a map generation module 510, a map display module 520, a map edition module 530, a map conversion module 540, and an object interworking module 550.

The map generation module 510 according to various embodiments of the present disclosure may generate a 3D map by using an image set. According to an embodiment of the present disclosure, the map generation module 510 determines a virtual point corresponding to a particular radius of an external space around the electronic device. The map generation module 510 obtains the image set for the external space through the functionally connected camera. The map generation module 510 maps the image set to the virtual point based on position information corresponding to the image set (e.g., a position, a direction, or motion in capturing). The map generation module 510 connects virtual points generated, respectively, corresponding to adjacent external spaces as a path, thereby generating a 3D map for the external spaces. For example, the 3D map may be an indoor map or an outdoor map. The virtual points may include a particular position in an external space around the electronic device and some areas around the particular position. For example, the virtual point may be a node forming a virtual path. The map generation module 510 connects the virtual points as a path based on position information regarding the virtual points.

Note that the virtual point is used to describe imaginary space around a device (or a user). Assuming a big imaginary sphere in which the device being centered, and then, at the view point of the device, inner surface of the sphere can be seen as surroundings. In this case, a particular radius represents the distance between the device and the inner surface of the globe and could be leveraged as threshold value. It could be set to a certain value, two meters, for example, in default and the device staying or moving within the radius could be assumed to be present in the same virtual point. However, if device moves and crosses the imaginary boarder of the sphere which is calculated based on the radius value, then the device could be assumed to be moved to another view point and the processors of the device could present the corresponding view point already created or create another view point and perform the rest. The radius value could be adjustable and programmable by users or developers, and its range is not necessarily to be definite; however, about from 1 meter to 5 meter would be considered as reasonable. The radius is not limited to horizontal but includes vertical or diagonal direction.

According to an embodiment of the present disclosure, the map generation module 510 determines the path connecting the virtual points based on the position information regarding the virtual points forming the 3D map. For example, the virtual point may include a particular position of an external space around the electronic device and some areas around the particular position. The virtual point may be, for example, a node forming a virtual path.

The map generation module 510 according to various embodiments of the present disclosure obtains an image through a camera functionally connected to the electronic device to configure the 3D map. The map generation module 510 includes at least a part of the obtained image as at least a part of an image set forming the 3D map. The map generation module 510 may generate at least some images of the 3D map by using the at least a part of the obtained image.

According to an embodiment of the present disclosure, the map generation module 510 generates an additional image by using the obtained image for detailing of the 3D map. For example, the map generation module 510 may generate an image connected by synthesizing images obtained at various angles, such as a panoramic image. The map generation module 510 may obtain 3D information (e.g., depth information indicating a distance from the electronic device to the object, a direction of the object, a relative position between objects, etc.), based on analysis of similar image data portions of the images obtained at various angles. For example, the map generation module 510 may generate the additional image based on the 3D information.

According to an embodiment of the present disclosure, the map generation module 510 obtains the image by using a camera-mounted external device (e.g., a smart device, a wearable device, a robot, a drone, an external camera, etc.). According to an embodiment of the present disclosure, the image may include data in a single format (e.g., Joint Photographic coding experts Group (JPG), Audio Video Interleaved (AVI), Moving Picture Experts Group (MPEG), Graphics Interchange Format (GIF), etc.), or may be in a format including customizing information (e.g., JPG exclusively for a virtual tour shot function included in Samsung's Galaxy 5™). According to an embodiment of the present disclosure, the map generation module 510 inserts information related to a device for capturing the image into single metadata together with the image. For example, the map generation module 510 may obtain various additional information (e.g., an angle, a height, motion, time, light characteristics, a depth, focusing information, exposure information, and the like at the time of capturing) in an image capturing process.

The map generation module 510 according to various embodiments of the present disclosure configures a virtual point based on position information obtained by various sensors or modules functionally connected with the electronic device, in a process of obtaining the image from the camera. For example, the map generation module 510 may use a Global Positioning System (GPS), an acceleration sensor, a gyro sensor, a WPS, etc. as the sensor or module for obtaining the position information.

According to an embodiment of the present disclosure, the map generation module 510 generates a virtual point based on the obtained position information. For example, the map generation module 510 may determine a virtual point corresponding to the position information on a spatial coordinates system (e.g., a 2D or 3D spatial coordinates system). The map generation module 510 may generate one virtual point with respect to a set of continuously obtained images if continuously obtaining the images in a single position. If a position of the electronic device changes (e.g., the electronic device moves forward) in a process of obtaining the images by the electronic device, the map generation module 510 may generate several virtual points along a path along which the position of the electronic device changes. The map generation module 510 associates the virtual point with position information related to the virtual point and stores the virtual point and the position information together.

According to an embodiment of the present disclosure, the map generation module 510 may generate connection information (e.g., a path, a direction, or a transition or switch effect) between virtual points based on position information regarding the virtual points. For example, based on a spatial distance between two virtual points, the map generation module 510 may generate connection information between the two virtual points or integrate the two virtual points into one virtual point. The map generation module 510 compares position information corresponding to two virtual points and generate a path connecting the two virtual points if a distance between the two virtual points falls within a first threshold range (e.g., greater than 1 meter and/or less than 3 meter). For example, the map generation module 510 may compare the position information corresponding to the two virtual points and integrate the two virtual points into one virtual point on a path connecting the two virtual points if a distance between the two virtual points falls within a second threshold range (e.g., less than 1 meter). The map generation module 510 may compare altitude-related position information and generate a separate path (e.g., an ascent, a descent, a downstairs, or an upstairs) if the virtual points having the same direction or the same distance have different altitudes. For example, the map generation module 510 may generate a transition effect for an image included in a virtual point, taking a direction of connection between two virtual points into account. The map generation module 510 may generate a transition effect of switching one image over to another image by using images oriented in the same direction as the connection direction, at each of the two virtual points. The transition effect may include, for example, fade-in, fade-out, zoom-in, zoom-out, partial synthesis, or the like.

The map generation module 510 according to various embodiments of the present disclosure obtains virtual point-related information. According to an embodiment of the present disclosure, the virtual point-related information may include information about an image set corresponding to the virtual point. Since the map generation module 510 may determine the virtual point in the image capturing process, the virtual point-related information may include 3D information (e.g., position, height, direction, etc.). The map generation module 510 configures virtual point-related information collected for the virtual point in the form of metadata. The map generation module 510 associates information having different characteristics with each other for the virtual point-related information obtained for the virtual point. For example, the map generation module 510 may associate an image with capturing position information regarding the image and insert the image and the capturing position information into single metadata.

According to an embodiment of the present disclosure, the virtual point-related information may be position information regarding the virtual point. The map generation module 510 determines a position of the virtual point by using position information related to a position where each image included in the image set related to the virtual point is captured. The map generation module 510 obtains position information by using LPPe2.0, Near Field Communication (NFC)/Radio Frequency Identification (RFID), a marker, a sensor, or the like, functionally connected with the electronic device. For example, the LPPe2.0 technology may include one or more of Radio Characteristic Information (RCI), an Image Recognition Based method (IRB), Pedestrian Dead Reckoning (PDR), a User Equipment (UE)-assisted motion sub-state, map based attributes, support for crowd sourcing of position and measurement information for a UE, indoor/outdoor transit area information, radio map data, UE-based IRB positioning, and an enhanced WLAN positioning information providing-based method. For example, the marker may be one or more of a bar code, a 2D code (one or more of a Quick Response (QR) code, PDF-417, and a data matrix), a water mark, and optical symbols arranged at predetermined intervals. The sensor may be one or more of a GPS, an acceleration sensor, a gyro sensor, a pressure sensor, a WPS, an NFC sensor, a geomagnetic sensor, an optical sensor, a wireless communication sensor, a proximity sensor, an ultrasound sensor, and a camera. The electronic device may be, for example, a cleaning robot which determines presence of a wall or an object by using a collision sensor, a proximity sensor, an ultrasound sensor, a camera, or a depth sensor (e.g., a Time-of-Flight (TOF)), an Infra-Red (IR) camera, a multi-view camera, etc.), while moving for itself. Also, when the cleaning robot moves, a distance and a direction the cleaning robot moves may be determined using the number of rotations of wheels mounted on the cleaning robot and a difference between the numbers of rotations of respective wheels, and an acceleration sensor, and a gyro sensor, a position of a wall in a building, a position of an object, or the like may be determined and a 2D map may be configured, by collecting paths the cleaning robot moves using one or more of a direction sensor. By combining a Wi-Fi fingerprint, a marker of a floor, or an NFC sensor of a ceiling with a corresponding position, particular position coordinates in a map may be determined. According to another embodiment, the proximity sensor or depth sensor technology may be used in a wearable device, a Closed Circuit Television (CCTV), or a smart phone as well as a robot.

According to an embodiment, the virtual point-related information may include information about a captured area. The map generation module 510 obtains the information about the captured area in a process of capturing an image in relation to a virtual point. The information about the captured area may include a direction the camera is oriented, the position of the camera, the altitude of the camera, a capturing time, a capturing composition, a capturing angle, motion in capturing, and a moving path in capturing.

According to an embodiment of the present disclosure, the virtual point-related information may include particular event information (e.g., birthday or meeting information on a schedule). According to another embodiment of the present disclosure, the virtual point-related information may include person information (e.g., a name of a person, contact information of the person, etc.) obtained based on face recognition from the captured image.

The map generation module 510 according to various embodiments of the present disclosure displays the virtual point-related information in the image capturing process to configure the 3D map. According to an embodiment of the present disclosure, the map generation module 510 displays the virtual point-related information on at least a part of a screen by using an auxiliary image (e.g., a mini map, etc.). For example, the auxiliary image may include a plurality of virtual points forming a 3D map and symbols related to a path connecting the plurality of virtual points. The map generation module 510 may characterize a current virtual point corresponding to a current capturing position of the electronic device for distinguishing of the current virtual point from another virtual point, by using the auxiliary image.

According to an embodiment of the present disclosure, the map generation module 510 may generate a new virtual point when image capturing is performed at a point spaced apart by a predetermined distance or longer from a previously generated virtual point. The map generation module 510 generates a path connecting the virtual point with the new virtual point. The map generation module 510 displays the generated path by using the auxiliary image.

The map generation module 510 according to various embodiments of the present disclosure provides, to a user, a guide for allowing the user to obtain an image in a position or direction facilitating configuration of the 3D map in a process of obtaining the image using the electronic device. The map generation module 510 provides a guide for an image obtaining direction to obtain images which have not yet been obtained out of images for forming the 3D map at a particular virtual point. The guide may include, for example, voice prompt, image display, vibration, light emission, or the like.

According to an embodiment of the present disclosure, the map generation module 510 displays a guide for obtaining images necessary for generating 3D information. The map generation module 510 determines a capturing direction (e.g., a horizontal angle or a vertical angle on a 3D coordinates system) of an obtained image and displays a guide for obtaining an additional image necessary for configuring the 3D information from the obtained image. For example, the map generation module 510 may obtain a first image from a camera functionally connected with the electronic device. The map generation module 510 may determine a first extension line in a direction the first image is captured from a position where the electronic device captures the first image. The map generation module 510 determines and guides a position and a direction of the camera of the electronic device, so that a second image to be obtained from the electronic device may have a condition facilitating generation of 3D information in association with the first image. For example, the map generation module 510 may display a guide to satisfy a condition that a second extension line in a direction the second image is to be captured from the position of the electronic device meets the first extension line at a point and forms an acute angle (e.g., an angle less than 90°).

According to an embodiment of the present disclosure, the map generation module 510 may perform image capturing based on a guide direction and motion of the electronic device. For example, the map generation module 510 may determine in which direction from the current virtual point an image has been obtained by the electronic device. The map generation module 510 determines in which direction a camera's focus has to be rotated so that the electronic device may obtain an image in a direction, which has not yet been obtained. The map generation module 510 displays a capturing guide for the direction to the user. If determining that the camera's focus is oriented in a proper direction according to the guide, the map generation module 510 may automatically capture an image corresponding to the direction. For example, the map generation module 510 may automatically capture the image if the user moves the camera and thus a capturing focus matches a capturing guide. The map generation module 510 also captures an image based on at least one input, if the user moves the camera and thus the capturing focus matches the capturing guide. For example, if the capturing focus matches the capturing guide, the map generation module 510 may highlight the capturing guide to guide the user to make an input with respect to capturing.

According to an embodiment of the present disclosure, the map generation module 510 guides image obtaining in response to a particular event. The particular event may include map image update time expiry, particular sound sensing, dangerous factor sensing, and the like. For example, the map generation module 510 may compare a time of obtaining images at a particular virtual point with a current time, and if a predetermined time has elapsed, a guide may be provided to capture a new image for update. To obtain an image of a point where an event (e.g., particular sound sensing, gas leakage sensing, etc.) occurs, the map generation module 510 may provide, for example, a guide for capturing the event-occurring point to a functionally connected external device (e.g., a CCTV, a dangerous area exploring robot, etc.).

The map generation module 510 according to various embodiments of the present disclosure matches an image set included in a 3D map or an image generated using at least a part of virtual point-related information to the virtual point. According to an embodiment of the present disclosure, by using the image set corresponding to the particular virtual point, the map generation module 510 matches at least one images included in the image set to a space inside the virtual point. For example, the map generation module 510 may synthesize at least a part of the image set corresponding to the virtual point to generate a new image for a direction which has not yet been obtained. The map generation module 510 matches the generated image to the virtual point to correspond to the direction. In another example, the map generation module 510 may generate an image indicating 3D information (e.g., depth information) based on feature point comparison between a plurality of images included in the image set corresponding to the virtual point. The map generation module 510 matches the image indicating the 3D information to the virtual point. In another embodiment, the map generation module 510 generates a new virtual point for a space between two or more virtual points by using respective image sets included in the two or more virtual points, and matches the image to the new virtual point.

According to an embodiment of the present disclosure, the map generation module 510 generates an image in a panoramic form by using an image set corresponding to a virtual point. For example, the panoramic image form may include a cylindrical form, a cubic form, a spherical form, or a semi-spherical form. According to another embodiment of the present disclosure, the map generation module 510 rotates a direction of the camera with respect to the virtual point to directly obtain a panoramic image including at least one directions, instead of obtaining the image set corresponding to the virtual point. According to another embodiment of the present disclosure, the map generation module 510 may obtain depth information of the panoramic image based on feature point comparison between images included in the panoramic image. The map generation module 510 applies the obtained depth information to the generated panoramic image.

According to an embodiment of the present disclosure, the map generation module 510 generates a 3D image based on feature points identified from the image set corresponding to the virtual point. The map generation module 510 determines spatially adjacent images among the images included in the image set. For example, the map generation module 510 may determine a degree to which images are spatially adjacent based on a direction, an angle, and a position in which each image is captured for an object included in common in the images. The map generation module 510 analyzes image data of the adjacent images to extract a common feature point. The map generation module 510 generates a 3D image based on the common feature point. The map generation module 510 can generate a virtual space by using the generated 3D image. For example, the map generation module 510 may generate a synthesized image of the images by using Scale Invariant Feature Transform (SIFT), Histogram of Oriented Gradient (HOG), harr feature, ferns, an Local Binary Pattern (LBP), or Modified Census Transform (MCT).

The map generation module 510 according to various embodiments of the present disclosure performs an operation of synthesizing at least a part of each of two or more 3D maps. According to an embodiment of the present disclosure, the map generation module 510 determines information related to a plurality of virtual points included in a first 3D map and a second 3D map. For example, the virtual point-related information may include at least one of position information of the virtual point, path information with respect to other virtual points, an image set corresponding to the virtual point, and capturing direction information of an image included in the image set.

The map generation module 510 according to various embodiments of the present disclosure uses information related to a virtual point included in each of two or more 3D maps (e.g., a first 3D map and a second 3D map) to generate a new 3D map (e.g., a third 3D map generated by synthesizing an intersection between the first 3D map and the second 3D map) including at least a part of each of the two or more 3D maps. The map generation module 510 generates a new virtual point or updates at least one of existing virtual points for use in generation of a new 3D map.

According to an embodiment of the present disclosure, in a process of synthesizing the new 3D map by using the first 3D map and the second 3D map, the map generation module 510 may generate new information from virtual points included in the first 3D map or the second 3D map. For example, the map generation module 510 may generate path information for the new 3D map, from a virtual point of the first 3D map to a virtual point of the second 3D map via a virtual point of an intersecting portion between the first 3D map and the second 3D map. For example, the map generation module 510 may generate a synthesized image by using an image set corresponding to the virtual point of the new 3D map, a first image corresponding to a first virtual point of the first 3D map, and a second image corresponding to a second virtual point of the second 3D map. The map generation module 510 may incorporate the generated new information in the new 3D map.

According to an embodiment of the present disclosure, the map generation module 510 determines an intersecting point between two or more 3D maps based on position information out of virtual point-related information. The map generation module 510 determines a virtual point of each 3D map adjacent to the intersecting point. The map generation module 510 collects data to one virtual point and synthesizes respective virtual points into one virtual point, by using at least some information included in the determined virtual points (e.g., an image set, a direction of obtaining an image included in the image set, position information, or 3D information). For example, the map generation module 510 may generate, for an overlapping point between a plurality of 3D maps, a new virtual point including at least a part of information about virtual points of each 3D map corresponding to the overlapping point. The map generation module 510 may generate a new virtual point including an image set corresponding to the first virtual point of the intersecting first 3D map and an image obtaining direction, an image set corresponding to the second virtual point of the intersecting second 3D map and an image obtaining direction, a path of the first 3D map, and a path of the second 3D map.

According to an embodiment of the present disclosure, in a process of generating the new virtual point corresponding to the intersecting point, the map generation module 510 analyzes feature points of images included in an image set corresponding to virtual points adjacent to the intersecting point. The map generation module 510 generates a synthesized image (e.g., an image or a panoramic image including 3D depth information) based on comparison between feature points identified from at least some of the images included in the image set. For example, the map generation module 510 may generate, as a synthesized image corresponding to a virtual point of a new 3D map, a panoramic image by synthesizing images in directions provided by the first virtual point and the second virtual point into one image. The generated panoramic image may provide a continuous field of view when a direction of view is changed from an area of the first 3D map to an area of the second 3D map.

According to an embodiment of the present disclosure, when synthesizing virtual points adjacent to the intersecting point between the two or more 3D maps into one virtual point, the map generation module 510 synthesizes the virtual points into one virtual point based on time information of an image set out of information about the respective virtual points. For example, if times when image sets of the respective virtual points are generated or synthesized fall within a previously set time difference (e.g., one month or one week), the map generation module 510 may include the image sets in an image set corresponding to one virtual point. An image set corresponding to one virtual point may be classified into several image sets according to time information. Even for the same or similar image obtaining direction among images, if times when the images are generated or synthesized have a previously set time difference or more (one month or more), the images may be classified into different image sets. For example, one virtual point may include several image sets according to season, day or night, weather, year, or user's selection. If a virtual point corresponds to the front of the window in the living room, the virtual point may include different panoramic images of the living room over time, a 3D image of the living room, a landscape image appearing through the window of the living room, or an image of the living room affected by illumination of day and night.

According to an embodiment of the present disclosure, the map generation module 510 generates a path connecting virtual points by using at least a part of the connection information, position information of virtual points and time information of an image set corresponding to the virtual points. For example, when time information (e.g., generation time or synthesis time) in an image set corresponding to the virtual points has a difference less than a particular value, the map generation module 510 may generate a path connecting the virtual points. If image data included in virtual points have a large time difference, the map generation module 510 may not synthesize the image data at all or may overwrite the image data with the latest image data. The map display module 520 according to various embodiments of the present disclosure provides a 3D map in various forms. For example, the map display module 520 may provide the 3D map in the form of a 3D virtual reality or a 2D plane view. The map display module 520 may provide a 3D map to switch view between virtual points or images included in the 3D map.

According to an embodiment of the present disclosure, the map display module 520 provides a 3D map based on a user's input. Based on a virtual point included in a 3D map selected by a user, the map display module 520 displays an image corresponding to the virtual point. For example, the map display module 520 may display at least one of images included in the image set corresponding to the virtual point.

According to an embodiment of the present disclosure, the map display module 520 switches view between the virtual points included in the 3D map in response to a user's input. The map display module 520 displays an image corresponding to a user's input direction at a virtual point included in the 3D map. For example, when an image corresponding to the north direction with respect to a virtual point is displayed, the map display module 520 may switch the image over to an image corresponding to the right (or east) direction based on a user's input made to the right (or to the east) (e.g., a touch or drag to the right on the screen or input of a right direction button).

According to an embodiment of the present disclosure, the map display module 520 provides an inter-image display transition effect when switching display between images included in a 3D map. For example, the map display module 520 may provide a transition effect (e.g., a zoom-in/zoom-out effect, a fade-in/fade-out effect, etc.) as an intermediate operation between a currently displayed image and a next image to be displayed.

The map display module 520 according to various embodiments of the present disclosure provides the 3D map based on a direction or position of the electronic device. For example, the map display module 520 may obtain at least one of a position, an altitude, and a direction of the electronic device by using at least one of sensors (e.g., a GPS, an acceleration sensor, a gyro sensor, a pressure sensor, a WPS, an NFC sensor, a geomagnetic sensor, an optical sensor, and a wireless communication sensor) functionally connected with the electronic device. The map display module 520 displays a virtual point on the 3D map based on at least one of the position, the altitude, and the direction of the electronic device. If there is no map data corresponding to the current position of the electronic device, the map display module 520 receives auxiliary map data corresponding to the position from an external device (e.g., the electronic device 102 or 104, or the server 106). By using at least a part of the received auxiliary map data, the map display module 520 displays a 3D map compensated for by inserting an image corresponding to a direction in which no map data exists into the map data.

When displaying a 3D map or a 2D map corresponding to the 3D map, the map display module 520 according to various embodiments of the present disclosure displays the 3D map or the 2D map on one screen or on a plurality of functionally connected displays. For example, in an environment where a wearable device and a smartphone are connected by wireless communication, the wearable device may display the 2D map (e.g., a mini map) and the smartphone may display the 3D map.

The map display module 520 according to various embodiments of the present disclosure performs a navigation operation on the 3D map. The map display module 520 determines a path from the first virtual point to the second virtual point on the 3D map based on the 3D map. The map display module 520 displays an image corresponding to at least one virtual points encountered along the path.

According to an embodiment of the present disclosure, the map display module 520 automatically displays or switches an image of a virtual point corresponding to a position of the electronic device moving along the path, based on position information or movement of the electronic device.

According to an embodiment of the present disclosure, the map display module 520 provides various information regarding the path to a destination on at least a part of the screen by using an auxiliary image (e.g., a mini map), based on the 3D map. For example, the map display module 520 may display at least one of the destination or the path from a starting point to the destination by using the auxiliary image. The map display module 520 may display the current position of the electronic device by using the auxiliary image. The map display module 520 may display a direction in which the electronic device is oriented by using the auxiliary image. The map display module 520 may determine a distance to the destination and display an interface corresponding to the distance by using the auxiliary image. For example, the map display module 520 may display the current position of the electronic device on the path by using the interface.

For a particular virtual point, the map display module 520 displays an image corresponding to a particular time from an image set including images having various time information. For example, if the electronic device captures an image toward a sofa at a virtual point in the living room every 3 months, the map display module 520 may display several images captured over time on the 3D map (e.g., one or more of an icon, a list, overlay images, and thumbnail grid images in corresponding direction and area on the 3D map) to the user. The map display module 520 displays information related to at least one of the images (e.g., a panoramic image, video, path moving information related to a corresponding virtual point, event information like a birthday, etc.). For example, the map display module 520 may display, on the 3D map, time information related to an image (e.g., time-related information including at least a part from a time of an initially generated image set to a time of the latest image set). The map display module 520 may sequentially switch and display images corresponding to a particular time duration in the 3D map or display a video effect (e.g., apply an inter-image transition effect).

The map edition module 530 according to various embodiments of the present disclosure edits a 3D map based on a user's input (e.g., a touch, a drag, or a gesture) or automatically. For example, the map edition module 530 may display a guide for helping the user to edit the 3D map to the user. The map edition module 530 may determine the degree of an error of the 3D map and automatically correct the error.

According to an embodiment of the present disclosure, the map edition module 530 determines the degree of an error of an image (e.g., a point where the image is not naturally mapped or a point distorted due to image synthesis) in the 3D map. For example, by applying at least one of an edge detector, a contour follower, and color marking to the images included in the 3D map for one or more of connection or disconnection of a boundary, discontinuation of vertical and horizontal segments, and color change, the map edition module 530 may determine the degree of an error for a corresponding point according to a result.

According to an embodiment of the present disclosure, the map edition module 530 displays a point to be edited or a guide for edition through the display. For example, the map edition module 530 may display an analyzed error point. The map edition module 530 may display a capturing guide to obtain an image for compensating for the error point.

According to an embodiment of the present disclosure, the map edition module 530 provides two or more obtained images corresponding to a particular point included in a selected 3D map. For example, the map edition module 530 may search for a plurality of images corresponding to the user-selected point in a memory and display found images on the screen. The map edition module 530 may arrange the found images based on capturing order and capturing position information.

According to an embodiment of the present disclosure, the map edition module 530 edits (e.g., deletes or modifies) a particular point included in the 3D map based on the user input. For example, the map edition module 530 may display virtual points forming the 3D map and an edition guide (e.g., an edition menu, an edition tool, etc.) for a user input through the display. The map edition module 530 may edit a virtual point based on the user input with respect to the edition guide.

According to an embodiment of the present disclosure, the map edition module 530 synthesizes an additional image and an image corresponding to a particular point of a 3D map. For example, the map edition module 530 may receive, from the user, a point at which the image is to be synthesized with the additional image. The map edition module 530 may synthesize the image with the additional image by using at least a part of the image corresponding to the synthesis point and at least a part of the additional image. For example, the image and the additional image may be synthesized based on common feature points among feature points identified from the image and the additional image.

The map conversion module 540 according to various embodiments of the present disclosure generates a 2D map from a 3D map. Based on 3D information determined from images included in the 3D map, the map conversion module 540 determines a boundary between objects included in the images. The map conversion module 540 generates a map on Mercator's based on the boundary. For example, the 2D map may include a form like an auxiliary map, a mini map, or a ground plan.

According to an embodiment of the present disclosure, the map conversion module 540 determines an arrangement structure of objects by using an image corresponding to one or more virtual points and depth information determined from the image. For example, the map conversion module 540 may determine an angle or a boundary between a wall and a floor, a wall and a ceiling, and a wall and another wall in the 3D map, based on depth information of an image corresponding to each virtual point.

According to an embodiment of the present disclosure, the map conversion module 540 may determine a characteristic structure (e.g., a corner, a passage, or a door) of objects on a path of the 3D map based on determined boundaries. The map conversion module 540 uses position information or direction information obtained in image capturing to determine a position of the characteristic structure. The map conversion module 540 determines a boundary between objects and positions of characteristic structures on a 2D map, by using a distance, a direction, or an angle between the characteristic structures.

According to an embodiment of the present disclosure, the map conversion module 540 determines structural characteristics between objects by using information obtained from various modules. For example, the map conversion module 540 may generate 3D information by using a depth sensor functionally connected with the electronic device. The map conversion module 540 may determine a distance between objects, based on images obtained using a stereo scope functionally connected with the electronic device. For example, the map conversion module 540 may determine a distance between objects by using a marker included in an image of a 3D map (e.g., feature points arranged at similar intervals along a boundary, an image code in which position information is indicated, etc.).

According to an embodiment of the present disclosure, the map conversion module 540 additionally obtains an image (e.g., an image of an object located in a blind spot) that is not included in the 3D map configuring process, and adds the obtained image to a part of the 2D map.

The map conversion module 540 according to various embodiments of the present disclosure determines an error between a user's actual moving path and a path of a generated map (e.g., a path of the 3D map or a path of the 2D map generated from the 3D map) in a process of generating the 3D map. The map conversion module 540 performs error correction with respect to a path undergoing an error. For example, the map conversion module 540 may correct the error of the path for images included in the 3D map by using at least one of Parallel Tracking and Mapping (PTAM) and Parallel Tracking and Multiple Mapping (PTAMM).

According to an embodiment of the present disclosure, the map conversion module 540 corrects another module (e.g., a sensor) functionally connected with the electronic device, by using a correction value related to error correction of the 3D map. For example, if determining that the error of the path occurs due to an error of a sensor functionally connected with the electronic device (e.g., a gyro sensor, an acceleration sensor, or an azimuth sensor), the map conversion module 540 may correct the sensor (e.g., correct a reference value or compensate for a result) by using a corrected value (e.g., modified direction angle information) determined in an error modification process for the path.

The object interworking module 550 (e.g., the object interworking modules 417 and 477) according to various embodiments of the present disclosure identifies an object appearing on an image included in the 3D map. For example, an object that may be identified by the object interworking module 550 may include various electronic products (e.g., a laptop computer, a washing machine, a refrigerator, etc.) or various non-electronic products (e.g., a carpet, a table, etc.), which appear on an image included in the 3D map. By using an image processing scheme including at least one of color identification, edge detection, boundary following, and feature point extraction for an image of the 3D map, the object interworking module 550 may identify an image area corresponding to a shape of at least a part of an object in the image. For example, the object interworking module 550 may analyze the image included in the 3D map to distinguish the image area corresponding to the object from at least some area of the image. The object interworking module 550 identifies the distinguished image area as the image area corresponding to the object. In another example, for an image included in the 3D map, the object interworking module 550 may identify at least some area of the image designated by the user as the image area corresponding to the object.

According to an embodiment of the present disclosure, the object interworking module 550 recognizes an identifier from the image included in the 3D map to identify the image area corresponding to the object. For example, the object interworking module 550 may recognize a product name, a product number, or a serial number for the object appearing on the image by using Optical Character Recognition (OCR), barcode recognition, or handwriting recognition.

The object interworking module 550 may recognize the image area corresponding to the object based on the above recognition.

According to an embodiment of the present disclosure, the object interworking module 550 identifies the image area corresponding to the object from at least a part of the image included in the 3D map by using a sample image related to the object. The sample image may include an image indicating a shape, a color, or a size of the object. For example, the object interworking module 550 may obtain the sample image for the object from an electronic device (e.g., the electronic device 101), an object, or an external device (e.g., the electronic device 102 or 104 or the server 106). The object interworking module 550 determines whether there is an area similar to the sample image in at least some area of the image included in the 3D map. The object interworking module 550 identifies, as an area corresponding to the object, an area having a high similarity level (e.g., a similarity level of 70% or higher) based on the determination. That is, the object interworking module 550 determines that the image included in the 3D map is similar with the sample image, if a similarity level between the two images is over a threshold value (for example, 70% or higher). In another example, the object interworking module 550 may identify a type of the object (e.g., a display, a home appliance, a furniture, etc.) based on a type of the sample image.

According to an embodiment of the present disclosure, the object interworking module 550 incorporates object identification information in the 3D map. For example, the object interworking module 550 may insert data regarding a size, a position, or a boundary of the identified image area corresponding to the object into data regarding the 3D map.

According to an embodiment of the present disclosure, the object interworking module 550 obtains information related to the identified object. For example, the information related to the object may include at least one of identification information (e.g., a product name, a product number, a serial number, a barcode, a Quick Response (QR) code, a product image, etc.), connection information (e.g., whether or not a communication module is mounted, whether or not a communication function is activated, a communication protocol, etc.), control information (e.g., a function list, a control interface, a control protocol, API information, a URL for the control interface, or panel information), operation state information (e.g., whether or not a function operates or a function is executable), simulation information (e.g., the amount of power consumption, the amount of noise generation, operating rules or standards, etc.). For example, the object interworking module 550 may obtain information related to the object from the external device (e.g., the electronic device 102, the electronic device 104, or the server 106). The object interworking module 550 inserts the information related to the object into 3D map data in relation to object identification information.

According to various embodiments of the present disclosure, the object interworking module 550 (e.g., the object interworking module 417) forms connection with an object (e.g., a connectivity object) identified from the 3D map. The object interworking module 550 forms wired/wireless communication connection between the electronic device and the object to provide information or a control function regarding a real object (e.g., an electronic product) corresponding to an object area through the object area on the image. The object interworking module 550 directly forms wired/wireless communication connection with the object or forms connection through a server (e.g., an object interworking server) wiredly/wirelessly connected with the object.

According to an embodiment of the present disclosure, the object interworking module 550 sends a directivity signal to an object (e.g., a connectivity object) appearing on the 3D map to form connection with the object. The object interworking module 550 may form connection with the object based on a response of the object to the directivity signal. According to another embodiment of the present disclosure, if a plurality of objects respond to the directivity signal, the object interworking module 550 induces a change of a direction of the electronic device to change an incident area of the directivity signal. For example, if receiving, from two external devices, a response to a directivity signal incident from the electronic device, the object interworking module 550 may display a guide for inducing the user to change the direction of the directivity signal of the electronic device in relation to the positions of the two external devices on the display.

The object interworking module 550 determines a relative position between objects based on a reaction of the object to the incident area of the direction-changed directivity signal. For example, the object interworking module 550 may determine a relative position between two electronic products based on at least one of an order and a duration of a reaction of each product with respect to movement of the electronic device. The object interworking module 550 forms connection with at least one of the two electronic products based on the determination.

According to an embodiment of the present disclosure, the object interworking module 550 recognizes a wireless communication (Wi-Fi, Bluetooth, NFC, IR, etc.) signal of an object. The object interworking module 550 determines identification information (e.g., a Media Access Control (MAC) address, a model name, etc.) of the object based on the recognition of the signal. The object interworking module 550 forms connection between the electronic device and the object based on the identification information.

According to an embodiment of the present disclosure, the object interworking module 550 recognizes an identification code (e.g., a barcode, a QR code, a product name, etc.) appearing on the image of the object. The object interworking module 550 obtains identification information corresponding to the object from the electronic device or the server based on the identification code. The object interworking module 550 forms connection between the electronic device and the object based on the identification information.

According to an embodiment of the present disclosure, the object interworking module 550 forms connection between the electronic device and the object based on a past connection record. The object interworking module 550 stores a connection record between the electronic device and the object and later forms connection with a similar object based on the connection record. If determining that there are several similar objects based on one connection record, then the object interworking module 550 forms connection with a high-similarity object (e.g., for the same product group, the same first letter of the ID).

According to various embodiments of the present disclosure, the object interworking module 550 receives control information related to an object based on connection with the object. The control information may include at least one of a name of an object, 3D model information (shape, size, orientation, material, color, reflectance, transparency, texture, elasticity, etc.) of the object, a list of functions provided by the object, control API information provided by the object, configuration information of an object control panel (e.g., a UI, etc.), and application information for controlling the object. For example, the object interworking module 550 may receive a control application related to the object from an external device for which connection is formed (e.g., an object or a server for which connection is formed).

According to an embodiment of the present disclosure, the object interworking module 550 (e.g., the object interworking modules 417 and 477) maps information (e.g., an identifier, an ID, a position, control information, a control interface, etc.) determined in the process of forming connection with the object to an image included in the 3D map. The object interworking module 550 displays the shape of the object or the information of the object in association with the image based on the mapping. For example, the object interworking module 550 may display information associated with the electronic product (e.g., a product name or a product ID) around the shape of the electronic product included in the image.

According to an embodiment of the present disclosure, the object interworking module 550 displays an interface for controlling the object in relation to an area corresponding to the object in the image. The object interworking module 550 determines an interface (e.g., a control panel, an on/off button, a timer button, etc.) for controlling the object, and displays the interface in relation to the area. For example, the object interworking module 550 may display connection state information (e.g., an indication of whether or not the object can be controlled, a visual effect corresponding to activation of the control panel, etc.) on the image of the 3D map, depending on a connection state between the electronic device and the object.

According to an embodiment of the present disclosure, the object interworking module 550 configures a UI for controlling the object based on control information related to the object. For example, the object interworking module 550 may configure the UI by using an API related to a function of the object. In another example, the object interworking module 550 may customize the UI for user convenience based on the control information (e.g., a control API of the object) and a user input.

According to various embodiments of the present disclosure, the object interworking module 550 displays an operation state of the object. The object interworking module 550 receives operation state information (e.g., operation on/off, temperature, reserved time, operating time, etc.) of the object based on connection with the object. For example, the operation state information of the object may be periodically transmitted from the object to the electronic device as the object operates. The object interworking module 550 may periodically send a request for the operation state information of the object and receive the operation state information as a response thereto. The object interworking module 550 may display the operation state information on the 3D map.

According to various embodiments of the present disclosure, the object interworking module 550 controls an actual function of the object based on a user input with respect to the control interface of the object, displayed on the image of the 3D map. The object interworking module 550 sends a control command provided by the interface to the object based on connection with the object. For example, the object interworking module 550 may send a washing start command to a washing machine based on a washing start input with respect to an interface corresponding to the washing machine. The washing machine having received the washing start command may perform an operation corresponding to start of washing.

According to various embodiments of the present disclosure, the object interworking module 550 performs simulation with respect to an object appearing on the image of the 3D map. The object interworking module 550 simulates a function provided by the object in the electronic device, without the actual operation of the object. The object interworking module 550 displays simulation information for the object or an effect corresponding to a simulation result on the 3D map.

Figure 6:
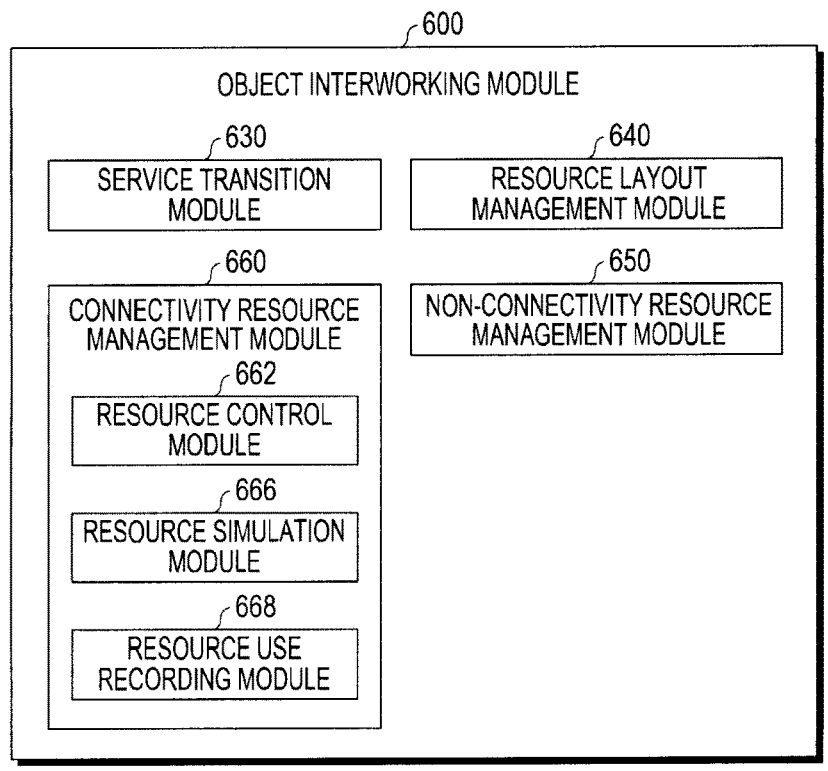
FIG. 6 is a block diagram of an object interworking module according to various embodiments of the present disclosure.

FIG. 6 is a block diagram of an object interworking module 600 according to various embodiments of the present disclosure. Referring to FIG. 6, the object interworking module 600 (e.g., the object interworking module 550) may include a service transition module 630, a resource layout management module 640, a non-connectivity resource management module 650, and a connectivity resource management module 660.

According to an embodiment of the present disclosure, based on a 3D map processed by the map platform module, the object interworking module 600 switches a service for the 3D map over to a service in which the 3D map and an object interwork with each other through the service transition module 630. According to an embodiment of the present disclosure, the object interworking module 600 stores and manages a 3D map and configuration and position information of an object appearing on the 3D map, by using the resource layout management module 640. According to an embodiment of the present disclosure, the object interworking module 600 interworks the 3D map with a real object appearing on the 3D map. The object interworking module 600 forms connection with a connectivity object through a communication interface of the electronic device or a network (e.g., an object interworking server). The object interworking module 600 forms virtual connection with a non-connectivity object based on information (e.g., a name, a classification, an ID, a 3D model, etc.) about the non-connectivity object, obtained from a user input or an external device.

According to an embodiment of the present disclosure, the object interworking module 600 stores information about an object, which is necessary for interworking between the 3D map and the object. The object interworking module 600 performs an operation related to a connectivity object through the connectivity resource management module 660, by using the information about the object. The information about the object may include at least one of an ID, a name, an image, a product name, a classification, a serial number, a manufacturing number, a MAC address, an Internet Protocol (IP) address, profile information, connection state information, control information, interface information, simulation information, 3D model information, operation state information, and communication possibility of the object. The object interworking module 600 receives the information about the object from the object or the external device or obtains the information from a user input. The object interworking module 600 provides virtual connection by using at least a part of the information about the non-connectivity object as if the non-connectivity object is a connectivity object. For example, if executing an operation for a function of the non-connectivity object, the object interworking module 600 may provide simulation for the non-connectivity object based on simulation information regarding the non-connectivity object, instead of sending a control signal for the operation.

Based on a 3D map processed from another module (e.g., the map generation module 510, the map display module 520, the map edition module 530, or the map conversion module 540), the service transition module 630 according to various embodiments of the present disclosure provides additional functions for an object recognized on the 3D map. According to an embodiment of the present disclosure, the service transition module 630 obtains the 3D map and layout information regarding an object appearing on the 3D map from the resource layout management module 640. The service transition module 630 displays the 3D map and the object based on the layout information.

According to an embodiment of the present disclosure, the service transition module 630 displays an interface for at least one operation among information display, control, monitoring, simulation, and use data recording for the object. For example, the service transition module 630 may obtain information including a configuration of the interface or a command corresponding to the interface from the connectivity resource management module 660 or the non-connectivity resource management module 650. According to an embodiment of the present disclosure, the service transition module 630 delivers a command to the object in response to the user input with respect to the interface, so that an operation corresponding to the interface may be performed by the object.

According to an embodiment of the present disclosure, the service transition module 630 provides a mutual operation between the object and the 3D map. According to another embodiment of the present disclosure, the service transition module 630 controls a function targeting at a non-connectivity object (e.g., a carpet) having formed no connection with the electronic device, among functions of a connectivity object (e.g., a cleaning robot) having formed connection with the electronic device. For example, the service transition module 630 may send a control command related to the non-connectivity object (e.g., a carpet cleaning command) to the connectivity object (e.g., the cleaning robot) in response to an input of dragging the cleaning robot appearing on the image of the 3D map to the carpet on the image of the 3D map.

The resource layout management module 640 according to various embodiments of the present disclosure obtains layout information of a recognized object based on the 3D map. For example, the layout information may include at least one of a position and an arrangement state of the object on the 3D map and a 3D model of the object. The resource layout management module 640 obtains the layout information from the 3D map processed by another module (e.g., the map generation module 510, the map display module 520, the map edition module 530, or the map conversion module 540). For example, the resource layout management module 640 may recognize an object appearing on the image of the 3D map and determine a point on the 3D map space where the object is positioned based on comparison between feature points of a plurality of 3D map images including the recognized object. The resource layout management module 640 may modify (e.g., move, re-arrange, or delete) layout information of a sub object (e.g., an air conditioner, a sofa, etc.) based on layout information (e.g., a structure) of a main object (e.g., a living room and a passage) appearing on the 3D map. The resource layout management module 640 sends a request for the layout information regarding the object to an external device and obtains the layout information from the external device in response to the request. For example, the resource layout management module 640 may obtain 3D model information regarding the object from a server (e.g., the object interworking server 470, the third-party providing server 480, etc.).

The non-connectivity resource management module 650 according to various embodiments of the present disclosure obtains, stores, or provides information about a non-connectivity object. According to an embodiment of the present disclosure, the non-connectivity resource management module 650 obtains the information about the non-connectivity object through a user input with respect to the recognized non-connectivity object. According to an embodiment of the present disclosure, upon receiving a request for the information about the non-connectivity object, which is necessary for an operation, from another module (e.g., the service transition module 630), the non-connectivity resource management module 650 delivers the information about the non-connectivity object to the module in response to the request.

The connectivity resource management module 660 according to various embodiments of the present disclosure obtains, stores, or provides information about a connectivity object. According to an embodiment of the present disclosure, the connectivity resource management module 660 obtains the information about the connectivity object from the recognized connectivity object through wired/wireless communication. According to an embodiment of the present disclosure, upon receiving a request for the information about the connectivity object, which is necessary for an operation, from another module (e.g., the service transition module 630), the connectivity resource management module 660 delivers the information about the connectivity object to the module in response to the request.

The connectivity resource management module 660 according to various embodiments of the present disclosure may include a resource control module 662, a resource monitoring module 664, a resource simulation module 666, and a resource use recording module 668. The connectivity resource management module 660 controls a connectivity object through the resource control module 662. The connectivity resource management module 660 virtually performs an operation corresponding to a case where the object receives a control signal, instead of controlling an actual operation of the connectivity object, through the resource simulation module 666. The connectivity resource management module 660 records various data generated during an operation of the connectivity object or controls or simulates the object based on the recorded data, through the resource use recording module 668.

The resource control module 662 according to various embodiments of the present disclosure obtains information for controlling an operation of an object having formed connection with the electronic device. According to an embodiment of the present disclosure, the resource control module 662 obtains control information (e.g., API information) related to a function of an object (e.g., the connectivity object 425) through the object or the external device. For example, if the object is an IoT-based product, the resource control module 662 may obtain an interface for the object through a web. The resource control module 662 may include UI/User Experience (UX) information such as a layout or menu configuration of an interface for controlling a function of the object.

According to an embodiment of the present disclosure, the resource control module 662 provides information for designating a non-connectivity object as a target for execution of a function of a connectivity object. The resource control module 662 obtains information about the non-connectivity object from the non-connectivity resource management module 650. The resource control module 662 determines based on the obtained information about the non-connectivity object, whether the connectivity object is capable of executing the function with respect to the non-connectivity object. Based on the determination, the resource control module 662 provides an interface for designating the non-connectivity object as a target for execution of the function of the connectivity object.

According to an embodiment of the present disclosure, the resource control module 662 sends a control command for the connectivity object to the object based on the control information regarding the connectivity object. The resource control module 662 incorporates additional information in the control command for the connectivity object to expand a function execution target of the connectivity object to another object. For example, the resource control module 662 may incorporate information about a non-connectivity object in the control command, such that the connectivity object may operate for the non-connectivity object.

According to an embodiment of the present disclosure, the resource control module 662 inquires control information related to control of an object from the object or an external device related to the object, and performs an update operation if there is new information.

The resource simulation module 666 according to various embodiments of the present disclosure performs a simulation operation with respect to an object recognized on the 3D map. The resource simulation module 666 provides simulation for a function of an object by using at least some of control information, simulation information, and use record information regarding the object. The simulation information may include, for example, information, such as the amount of power consumption, the amount of heat emission, the amount of light emission, the amount of sound generation, the amount of durability reduction, the degree of vibration, a time required for an operation, or the amount of electromagnetic wave generation, corresponding to the operation of the object. The resource simulation module 666, instead of sending a control command for a function to an object, computes and displays an effect of the operation of the object, an operation radius, and an influence of the operation on surroundings based on at least some of the control information, the simulation information, and the use record information regarding the function. For example, as simulation corresponding to "switch on" for an illuminating device recognized on the image of the 3D map, the resource simulation module 666 may display the illuminating device and an image area corresponding to the periphery of the illuminating device brightly. In another example, the electronic device may display a brightness and a power consumption which last during the on state of the illuminating device based on simulation corresponding to the switch-on state of the illuminating device. The resource simulation module 666 automatically switches the object control operation to the simulation operation based on "power-off" of the object or "disconnection" of communication with the object.

According to an embodiment of the present disclosure, the resource simulation module 666 is provided with information (e.g., a type of a function, simulation information, resource use data, etc.) necessary for performing simulation from another module (e.g., the resource control module 662, the resource use recording module 668, etc.), the object, or the server. For example, the simulation information may include information, such as the amount of power consumption, the amount of heat emission, the amount of light emission, the amount of sound generation, the amount of durability reduction, the degree of vibration, a time required for an operation, or the amount of electromagnetic wave generation, corresponding to the operation of the object. The simulation information may be information (e.g., information collected through a test and provided by a manufacturer) previously known based on product characteristics of the object. The simulation information may be collected through data related to the object, which is recorded in the resource use recording module 668.

The resource use recording module 668 according to various embodiments of the present disclosure records various data generated during the operation of a connectivity object. For example, the resource use recording module 668, if being capable of controlling a connected illuminating device, may record a use time, a brightness change, and a temperature change of the illuminating device. The resource use recording module 666 processes recorded data to derive other information. For example, the remaining life expectancy of an electric bulb of the illuminating device may be estimated based on the recorded use time, brightness change, and temperature change of the illuminating device. If the estimated remaining life expectancy is less than a particular value, a signal for requesting replacement of the bulb may be generated. According to an embodiment of the present disclosure, data related to an object may include various data that is quantifiable according to device elements, functions, and characteristics of the object. A format or material structure of the data related to the object may be obtained from the object or an external device related to the object. In order to be compatible with control information (e.g., a function control API) of an object in association with a function of the object, the format or material structure of the data related to the object may be provided as a part (e.g., a format defined as an API) of the control information.

According to various embodiments of the present disclosure, information about a non-connectivity object or information about a connectivity object is obtained in various ways. According to an embodiment of the present disclosure, the information about the non-connectivity object or the information about the connectivity object is obtained from an electronic device (e.g., the electronic device 410) or an external device (e.g., the third-party providing server 480, another electronic device 440, or the object interworking server 470). For example, a server supporting information about an electronic product may own control information, interface information, and 3D model information. The electronic device may send a request for necessary information to the server and receive the information from the server in response to the request. According to an embodiment of the present disclosure, the information about the non-connectivity object or the information about the connectivity object is obtained from the object through a communication interface. For example, it may be determined whether the object is of a non-connectivity type or a connectivity type based on whether or not a wired/wireless communication signal is received from the object. From the connectivity object having formed communication connection, information stored in the connectivity object may be obtained. According to an embodiment of the present disclosure, the information about the non-connectivity object or the information about the connectivity object is obtained through the user input. For example, the user may select an object recognized on the 3D map and input information using a particular input form for the selected object.

Figure 7:
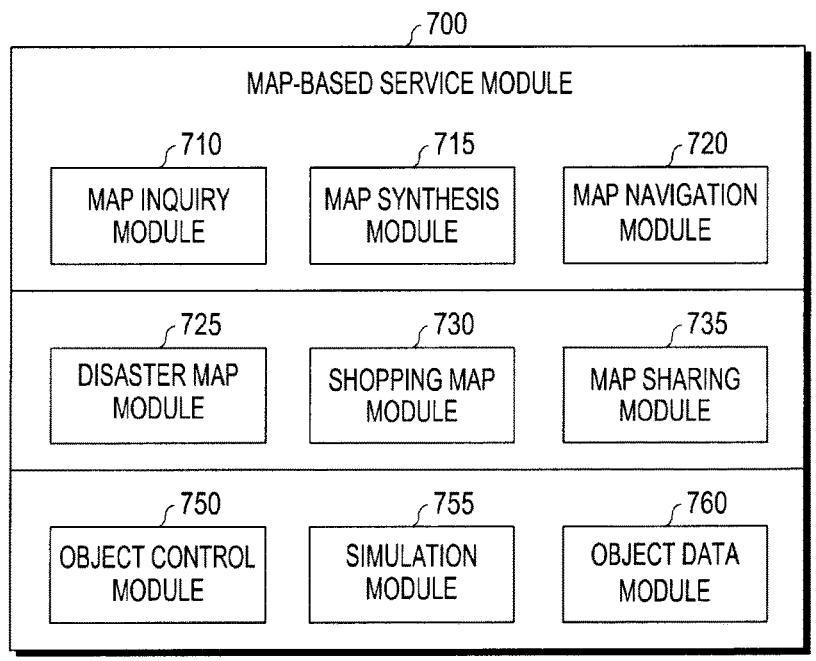
FIG. 7 is a block diagram of a map-based service module according to various embodiments of the present disclosure.

FIG. 7 is a block diagram of a map-based service module 700 according to various embodiments of the present disclosure. The map-based service module 700 (e.g., the map-based service module 412) according to various embodiments of the present disclosure provides various services to a user based on a 3D map processed from a map platform module (e.g., the map platform module 415). For each service, the map-based service module 700 provides a screen configuration and a UI for executing the service. The map-based service module 700 sends a request for execution of a function selected by the user through the interface to a related service module. The service module having received the request sends a request for information or a processing task, necessary for execution of the function, to a map platform module (e.g., the map platform module 412) or the external device.

The map-based service module 700 according to various embodiments of the present disclosure may include a map inquiry module 710, a map synthesis module 715, a map navigation module 720, a disaster map module 725, a shopping map module 730, a map sharing module 735, an object control module 750, a simulation module 755, and an object data module 760.

Based on a 3D map processed from the map platform module, the map inquiry module 710 displays the 3D map and information related to the 3D map on the screen. For example, the map inquiry module 710 may provide an interface for allowing the user to conveniently look around a space in the 3D map on the screen. The map inquiry module 710 may display a screen effect corresponding to scene transition in the 3D map. The map inquiry module 710 may provide a search function for searching for a position in the 3D map or information about an object included in the 3D map.

The map synthesis module 715 provides an interface and information related to synthesis of the 3D map. For example, the map synthesis module 715 may provide a UI for synthesizing the 3D map. The map synthesis module 715 may provide a UI for sharing data for 3D map synthesis or data corresponding to the synthesis result with an external device. The map synthesis module 715 provides information about 3D map synthesis (e.g., a list of maps used for synthesis, a list of external devices that share map data, etc.) and an interface for managing the information.

Based on a 3D map processed by the map platform module, the 3D map navigation module 720 provides a guide for a path to a user's destination. The guide may include a path indication, a guide indication, and a notice indication of the 3D map.

Based on the 3D map processed by the map platform module, the disaster map module 725 displays a guide for an emergency and an evacuation path in an area on the 3D map. If receiving a signal related to occurrence of a disaster, the disaster map module 725 determines a path and an emergency exit included in the 3D map. The disaster map module 725 determines a path that is closest to the emergency exit or detours an area where the disaster situation occurs, and provides the path.

According to an embodiment of the present disclosure, the disaster map module 725 determines whether a disaster occurs. For example, the disaster map module 725 may receive a broadcast signal indicating a disaster from a disaster service server and determine whether the disaster occurs. The disaster map module 725 may obtain sensing data (e.g., screams of persons sensed by a microphone, a particular word such as "Fire!," a vibration pattern related to an earthquake, sensed by a vibration sensor, etc.) from a particular sensor (e.g., a microphone, a smoke sensor, a heat sensor, a vibration sensor, etc.). The disaster map module 725 may determine whether the disaster occurs through processing applied to a disaster module by using the sensing data. The disaster map module 725 may receive information about the determination from another electronic device capable of determining whether the disaster occurs.

According to an embodiment of the present disclosure, the disaster map module 725 obtains data (e.g., a 3D map of a disaster-occurring area, whether or not occurrence of a disaster is sensed, an evacuation path, etc.) for a service corresponding to the disaster. For example, the disaster map module 725 may send a request for processing the data to the map platform module. In another example, the disaster map module 725 may obtain information about a server capable of providing a disaster service (e.g., an IP address, domain information, connectivity information, and authentication information of a disaster service server) from nearby broadcasting information related to the disaster service. The disaster map module 725 may send a request for the data to the disaster service server.

According to an embodiment of the present disclosure, if a space where the electronic device is positioned collapses or is overturned due to a disaster, the disaster map module 725 modifies the 3D map and provides the modified 3D map. For example, if spatial rotation occurring between a user's visual point at which manipulation of the electronic device is performed and the horizon is sensed using a sensor (e.g., the gyro sensor), the disaster map module 725 corrects the 3D map by the rotation and displays the corrected 3D map.

According to an embodiment of the present disclosure, the disaster map module 725 controls a disaster-preventing object (e.g., a spring cooler, an alarm, a fire-prevention shutter, etc.) appearing on the 3D map under a disaster situation. The disaster map module 725 determines whether the electronic device is authorized to control the disaster-preventing object under the disaster situation, and requests control information regarding the disaster-preventing object based on the determination. The disaster map module 725 provides a control interface for the disaster-preventing object based on the control information.

According to an embodiment of the present disclosure, the disaster map module 725 displays a 3D map service for the disaster situation in various ways. The disaster map module 725 may provide a service using at least one of images, voice, and vibration against occurrence of a particular event (e.g., a need to reduce power consumption of the electronic device, damage to a display, background noise, an injury of a cognitive organ of a user, etc.) in the disaster situation.

The shopping map module 730 provides an interior map of a shopping center or a shopping mall and information about stores of the shopping center or the shopping mall based on a 3D map processed by the map platform module. The shopping map module 730 provides a 3D map and store information obtained from a shopping center server. The store information may include at least one of a name of a store, items for sale, contact information, discount information, coupon information, and a membership service.

The map sharing module 735 provides an expanded function through sharing of the 3D map with another electronic device and the 3D map, based on the 3D map processed by the map platform module. According to an embodiment of the present disclosure, the map sharing module 735 shares position information with the another electronic device based on 3D map data sharing with the another electronic device. For example, the map sharing module 735 may identify users included in a data exchange group (e.g., a network group, an SNS group, or a 3D map sharing group) including the electronic device, and request position information regarding users belonging to the group. The map sharing module 735 may display the position information on the shared 3D map.

According to an embodiment of the present disclosure, the map sharing module 735 provides information to the other electronic device based on the shared 3D map data and position information. For example, the map sharing module 735 may control an object (e.g., an electric bulletin board, a speaker, etc.) capable of delivering a message on the 3D map to send a message (e.g., an electric bulletin board message, a voice guide message, etc.) a user of another electronic device can see or hear. For example, the map sharing module 735 may determine and provide path information destined to a particular position of the 3D map in the position of the other electronic device, based on the shared 3D map and position information.

According to another embodiment of the present disclosure, the map sharing module 735 provides various processing results through another module based on shared 3D map data. For example, the map sharing module 735 may provide a new 3D map by synthesizing at least a part of 3D map data provided from another electronic device with at least a part of 3D map data stored in the electronic device. The map sharing module 735 may form connection with another electronic device sharing a position or control the other electronic device through the object interworking module. For example, the map sharing module 735 may guide a way for a particular position in the shared 3D map through the 3D map navigation module.

The object control module 750 provides functions for controlling an object appearing on the image of the 3D map based on the 3D map and the object processed by the map platform module. The object control module 750 provides an interface based on control information related to a function of the object. Based on a user input with respect to the interface, the object control module 750 delivers a control command corresponding to the input to the object through a resource control module (e.g., the resource control module 662).

Based on the 3D map and object processed by the map platform module, the simulation module 755 provides functions for simulating a function of the object appearing on the image of the 3D map. The simulation module displays various effects corresponding to execution of the function of the object through the resource simulation module (e.g., the resource simulation module 666), based on control information or use data related to the function of the object.

Based on the 3D map and object processed by the map platform module, the object data module 760 processes quantitative data generated during execution of the function of the object appearing on the image of the 3D map. The object data module 760 provides user-desired information out of data recorded in relation to an operation of the object and data obtained by processing at least a part of the recorded data, through the resource use recording module (e.g., the resource use recording module 668).

According to some embodiments of the present disclosure, the map-based service module 700 may not include some of the aforementioned modules or may further include additional modules. In another embodiment of the present disclosure, some modules included in the map-based service module 700 may include a function of another module, and at least some functions of the some modules may be performed by another module. Some modules of the map-based service module 700 may be implemented as a part of the map platform module (e.g., the map platform module 415).

Figure 8:
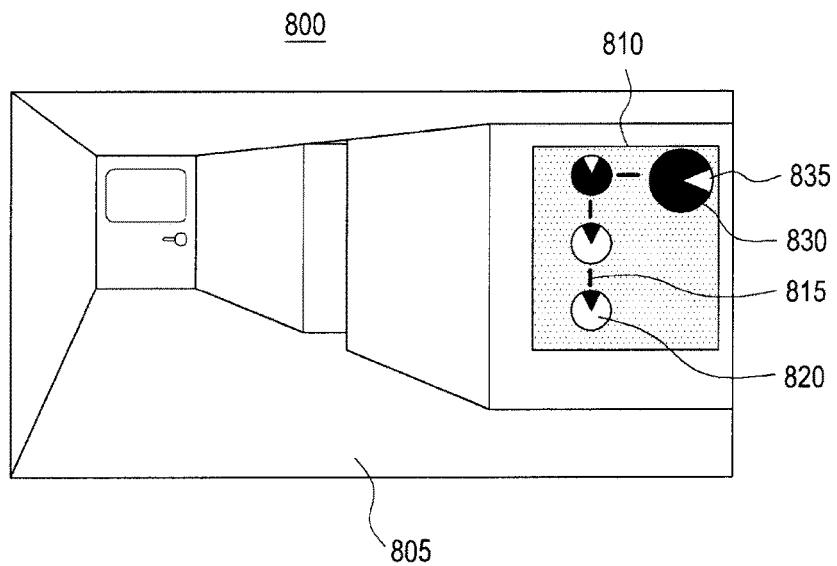
FIG. 8 illustrates an example of a User Interface (UI) displayed in image capturing in an electronic device according to various embodiments of the present disclosure.

FIG. 8 illustrates an example of a UI displayed in image capturing in an electronic device according to various embodiment of the present disclosure. The electronic device according to various embodiments of the present disclosure displays information related to a virtual point during image capturing for configuring a 3D map. For example, an auxiliary image like a mini map may be displayed on a part of the screen to display the virtual point-related information.

Referring to FIG. 8, a camera preview screen shot 800 according to various embodiments of the present disclosure may include an object 805 and a mini map 810. The preview screen shot 800 may include a part of a UI shown in other drawings.

According to an embodiment of the present disclosure, the mini map 810 may include symbols for a plurality of virtual points 820 and 830 forming a 3D map and a path 815 connecting the virtual points 820 and 830. For example, the mini map 810 show four distinguished virtual points, two paths connecting the virtual points in a north-south direction, and one path connecting the virtual points in an east-west direction. The electronic device may display, on the paths, a direction the electronic device moves along a path the electronic device captures an image.

According to an embodiment of the present disclosure, the mini map 810 shows virtual point-related information. For example, the mini map 810 displays the current virtual point 830 corresponding to a current capturing position of the electronic device to be distinguished from another virtual point 820 (e.g., using a different size or color). The mini map 810 displays a particular figure (e.g., a fan shape) in a particular direction (e.g., to the right or to the east) with respect to a virtual point like a symbol 835, thereby indicating that an obtained image (e.g., an image of the object 805) has been captured by orienting the electronic device in the particular direction with respect to the current position.

According to various embodiments of the present disclosure, virtual points displayed on the mini map 810 are displayed as a spherical or polyhedral shape (e.g., a tetrahedron, an octahedron, etc.) to indicate a direction of an image obtained at the virtual point on a 3D space, an orientation of the electronic device, or a direction the camera preview screen shot 800 is obtained. According to an embodiment of the present disclosure, the electronic device generates a new virtual point when an image is captured at a point distant by a predetermined distance or longer from an existing generated virtual point. The electronic device displays the generated new virtual point on the mini map. The electronic device generates a path connecting the virtual point with the new virtual point. The electronic device may display the generated path on the mini map.

Figure 9:
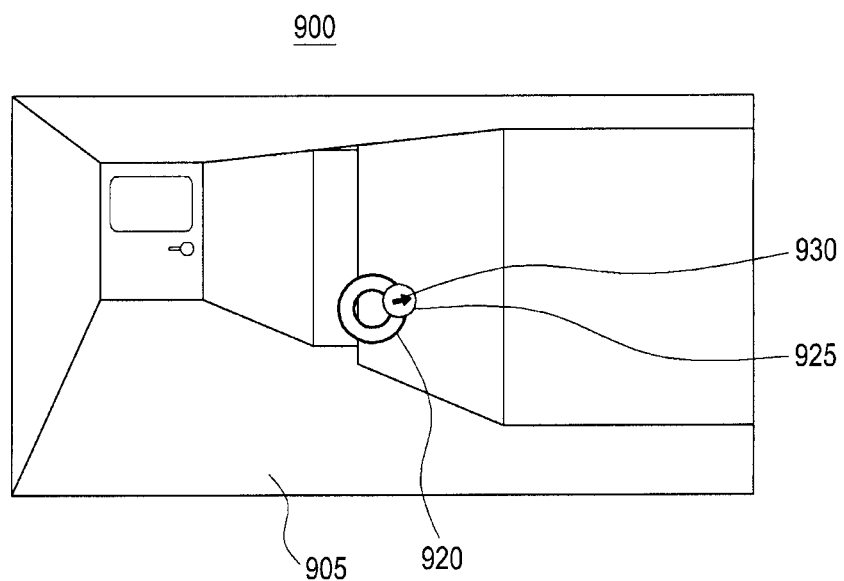
FIG. 9 illustrates an example of a UI displayed in image capturing in an electronic device according to various embodiments of the present disclosure.

FIG. 9 illustrates an example of a UI displayed in image capturing in an electronic device according to various embodiments of the present disclosure. Referring to FIG. 9, a camera preview screen shot 900 according to various embodiments of the present disclosure may include an object 905, a capturing focus 920, a capturing guide 925, and a direction guide 930. The preview screen shot 900 may include a part of a UI illustrated in other drawings. The capturing focus 920 indicates the center of a direction in which a lens of the camera is oriented. The capturing guide 925 is indicated in the same direction as a direction of an image to be obtained (e.g., an image corresponding to a direction which has not yet been obtained in the 3D map) with respect to the capturing focus 920.

According to an embodiment of the present disclosure, when determining to additionally obtain an image corresponding to the right direction, the electronic device displays a capturing guide (e.g., the capturing guide 925 or a direction guide 930) to the right of a capturing focus (e.g., the capturing focus 920) to encourage the user to move the camera. For example, if the capturing focus matches the capturing guide as the user moves the camera, the electronic device may automatically capture an image. Also, if the capturing focus matches the capturing guide, the electronic device may stop displaying the direction guide and capture an image in response to an input with respect to the capturing guide.

Figure 10:
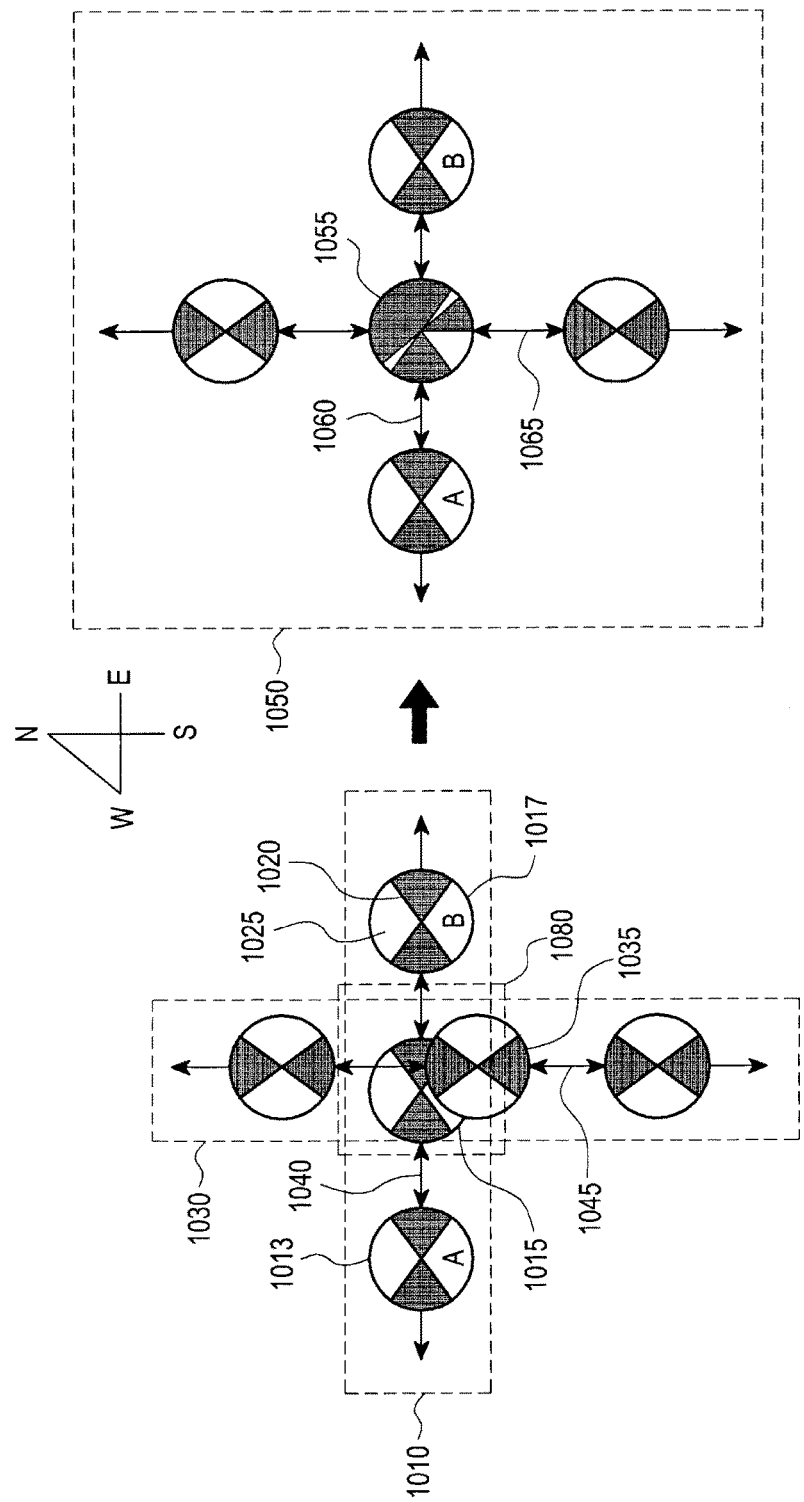
FIG. 10 illustrates an example of a process in which an electronic device synthesizes 3D maps according to various embodiments of the present disclosure.

FIG. 10 illustrates an example for describing a process of synthesizing 3D maps in an electronic device according to various embodiments of the present disclosure. Referring to FIG. 10, a first 3D map 1010 according to various embodiments of the present disclosure may include paths (e.g., a first path 1040) connecting a plurality of virtual points (e.g., a first virtual point 1015, a fourth virtual point 1013, and a fifth virtual point 1017). Likewise, a second 3D map 1030 according to various embodiments of the present disclosure may include paths (e.g., a second path 1045) connecting a plurality of virtual points (e.g., a second virtual point 1035).

Virtual point-related information according to various embodiments of the present disclosure may include at least one of position information regarding a virtual point, path information in connection with other virtual points, an image set corresponding to a virtual point, and capturing direction information regarding an image included in the image set. For example, information related to the fifth virtual point 1017 may include path information between the fifth virtual point 1017 and the first virtual point 1015, capturing direction information 1020 indicating a direction in which each image included in an image set corresponding to the fifth virtual point 1017 is captured, and the non-capturing direction information 1025 regarding a direction in which an image has not yet been captured in relation to the fifth virtual point 1017.

The electronic device according to various embodiments of the present disclosure generates a new 3D map (e.g., a third 3D map 1050) including at least a part of each of a plurality of 3D maps (e.g., the first 3D map 1010 and the second 3D map 1030), by using information related to a virtual point included in each of the plurality of 3D maps. The electronic device generates a new virtual point or updates at least one of existing virtual points for use in generation of a new 3D map.

According to an embodiment of the present disclosure, the electronic device generates new information from virtual points included in 3D maps which have not yet been synthesized, during generation of the new 3D map. For example, the electronic device may generate path information regarding a path from a virtual point of a first 3D map to a virtual point of a second 3D map through a virtual point (e.g., a third virtual point 1055) of an intersecting part. A third image obtained by synthesizing a first image related to the first virtual point 1015 with a second image included in the second virtual point 1035 may be included in a new 3D map.

According to an embodiment of the present disclosure, the electronic device may synthesizes intersecting virtual points adjacent to an intersecting point between a plurality of 3D maps into one virtual point. For example, the electronic device may generate a new virtual point including at least a part of information regarding the intersecting virtual points (e.g., position information, a related image set, a direction of obtaining images included in the related image set, etc.). The electronic device may generate the third virtual point 1055 including the image set and image obtaining direction corresponding to the first virtual point 1015, the image set and image obtaining direction corresponding to the second virtual point 1035, the first path 1040, and the second path 1045.

The electronic device according to various embodiments of the present disclosure may be described as below.

According to various embodiments of the present disclosure, an electronic device includes a memory configured to store an image set and a map platform module which is functionally connected with the memory and is implemented with a processor. The map platform module is configured to obtain a first image set including a plurality of images of a first path on an external space surrounding the electronic device, to obtain a second image set including a plurality of images of a second path on the external space, to determine whether a point exists where the first path and the second path overlaps with each other, and to generate a 3D map for the first path and the second path by using at least a part of the first image set and at least a part of the second image set if the point exists.

According to various embodiments of the present disclosure, the 3D map switches view from at least some images of the first image set to at least some images of the second image through the overlapping point.

According to various embodiments of the present disclosure, at least one of the first image set and the second image set switches view between a plurality of images corresponding to the at least one image set.

According to various embodiments of the present disclosure, at least one of the first image set and the second image set includes or is associated with 3D information for a path out of the first path and the second path corresponding to the at least one image set, generated based on comparison between a first feature point corresponding to the first image of the at least one image set and a second feature point corresponding to the second image of the at least one image set.

According to various embodiments of the present disclosure, the map platform module generates a third image by synthesizing the at least a part of the first image set with the at least a part of the second image set, and by additionally using the third image, generates the 3D map such that the generated map includes at least a part of the first path, at least a part of the second path, and the overlapping point.

According to various embodiments of the present disclosure, the map platform module generates at least one 3D information in association with a part of the 3D map or the 3D information, based on comparison between the first feature point identified from the at least a part of the first image set and the second feature point identified from the at least a part of the second image set.

According to various embodiments of the present disclosure, the map platform module captures a first image corresponding to a first viewpoint with respect to at least one external object located on or near the first path and a second image corresponding to a second viewpoint with respect to the external object, and generates 3D information regarding the external object by using the first image and the second image.

According to various embodiments of the present disclosure, the map platform module displays a guide corresponding to at least one of the first viewpoint and the second viewpoint through a display functionally connected with the electronic device, and automatically captures at least one of the first image and the second image, which corresponds to the guide, based on sensing of movement of the electronic device corresponding to the guide, through a camera module functionally connected to the electronic device.

According to various embodiments of the present disclosure, at least one of the first image set and the second image set are received from an external device with respect to the electronic device.

According to various embodiments of the present disclosure, the map platform module displays at least one image corresponding to a current position of the electronic device out of an image set corresponding to the 3D map and switches view from the at least one image to an image corresponding to a new position of the electronic device out of the image set of the 3D map as a reaction to movement of the electronic device.

According to various embodiments of the present disclosure, the map platform module generates, based on identification of at least one feature point from objects included in the 3D map, a map indicating a boundary between the objects in association with the 3D map or as a part of the 3D map.

Figure 11:
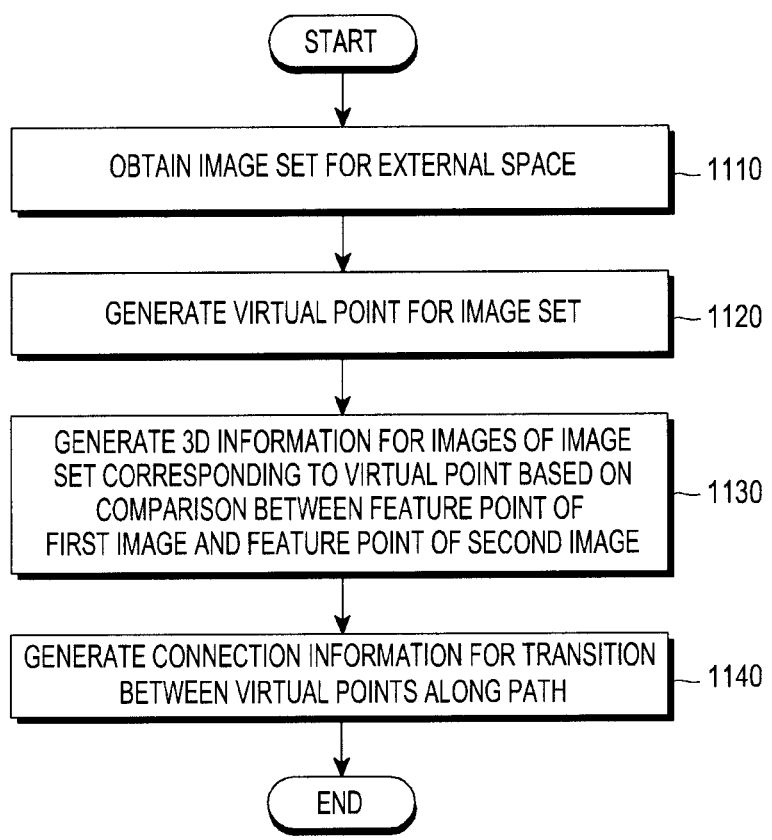
FIG. 11 is a flowchart of a method for creating a 3D map in an electronic device according to various embodiments of the present disclosure.

FIG. 11 is a flowchart of a method for generating a 3D map in an electronic device according to various embodiments of the present disclosure. Referring to FIG. 11, in operation 1110, the electronic device obtains an image set including a plurality of images of an external space. For example, the electronic device may capture an image through a camera functionally connected thereto. The electronic device obtains capturing information (e.g. a capturing direction, a capturing position, etc.) corresponding to the image in a process of capturing the image. For example, the electronic device may display a guide for obtaining the image during capturing of the image. The electronic device may display a guide for obtaining a next image in a direction in which effective 3D information may be generated, based on capturing information of a previous image, when the images are continuously captured. For example, the electronic device may obtain images and capturing information from an external device.

In operation 1120, the electronic device generates a virtual point based on capturing information related to images included in the image set. For example, the electronic device may determine a position of the virtual point based on capturing position information of an image. The virtual point may be set to have a particular radius. The electronic device may match images captured within the radius to the virtual point. Based on the capturing information regarding the images, the electronic device generates information about an element (e.g., a direction, an altitude, a distance, etc.) in the virtual point the images are matched to.

In operation 1130, the electronic device generates 3D information by using the images of the image set corresponding to the virtual point. For example, the electronic device may compare a first feature point identified from a first image included in the image set with a second feature point identified from a second image to generate 3D information (e.g, depth information) using parallax information. The electronic device may associate the 3D information with the first image or the second image or incorporate the 3D information in the image set. The electronic device may reflect the 3D information in a third image generated by synthesizing the first image with the second image, by using the 3D information.

In operation 1140, the electronic device generates connection information to allow transition between virtual points along a path. The electronic device generates connection information between adjacent virtual points among the virtual points, based on position information of the virtual points. The electronic device generates, as at least a part of the connection information, an image transition effect between images corresponding to connected virtual points.

Figure 12:
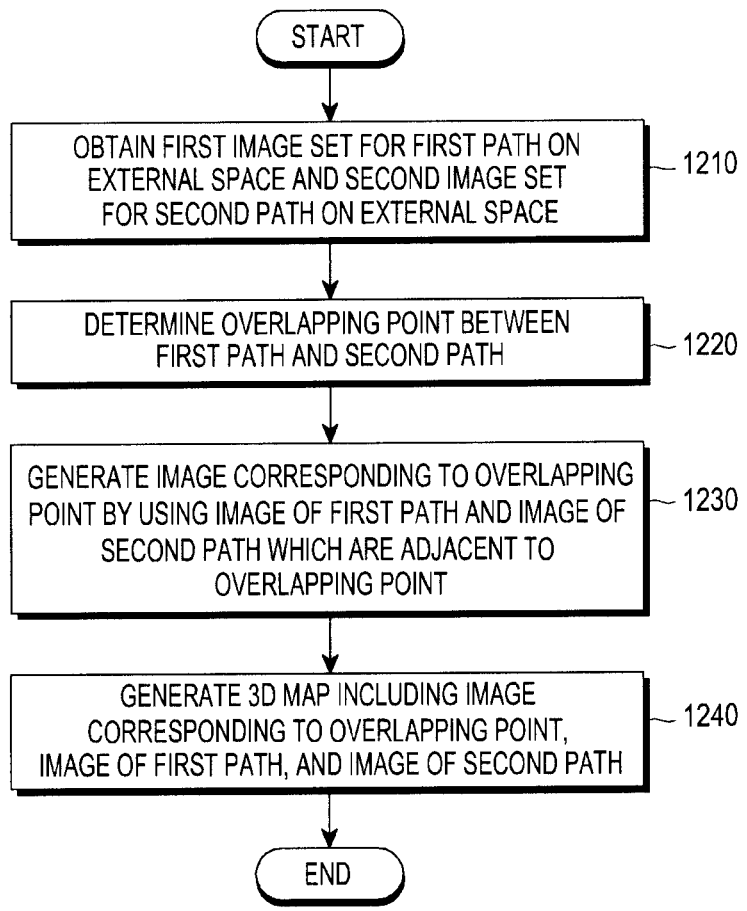
FIG. 12 is a flowchart of a method for synthesizing 3D maps in an electronic device according to various embodiments of the present disclosure.

FIG. 12 is a flowchart of a method for synthesizing 3D maps in an electronic device according to various embodiments of the present disclosure. Referring to FIG. 12, in operation 1210, the electronic device obtains a first image set including a plurality of images for a first path of an external space and a second image set including a plurality of images for a second path of the external space. For example, the first image set or the second image set may form a 3D map. The electronic device may obtain the first image set or the second image set through capturing with a camera functionally connected thereto or from an external device.

In operation 1220, the electronic device determines an overlapping point between a first path and a second path. For example, the electronic device may determine the overlapping point between the first path and the second path based on at least a part of capturing information (e.g., position information) corresponding to images for the first path and the second path.

In operation 1230, the electronic device generates an image for the overlapping point. The image for the overlapping point may include an image generated by including or synthesizing at least parts of the images for the first path and the second path corresponding to the overlapping point. For example, the electronic device may generate 3D information based on comparison between feature points of the first image included in the image set for the first path and feature points of the second image included in the image set for the second path with respect to the overlapping point. The electronic device may associate the 3D information with the overlapping point.

In operation 1240, the electronic device generates a 3D map which includes the image for the overlapping point, at least a part of the image set for the first path, and at least a part of the image set for the second path. For example, the electronic device may generate the 3D map for a path connecting at least a part of the first path, the overlapping point, and at least a part of the second path. The electronic device may generate connection information between the overlapping point and the first path or connection information between the overlapping point and the second path. The electronic device may generate, as a part of the connection information, an image transition effect between images corresponding to the overlapping points and images corresponding to points on each path.

The method for controlling the electronic device according to various embodiments of the present disclosure may be described as below.

According to various embodiments of the present disclosure, a method for controlling an electronic device includes obtaining, at an electronic device, a first image set including a plurality of images for a first path on an external space surrounding the electronic device, obtaining a second image set including a plurality of images of a second path on the external space, determining whether a point exists where the first path and the second path overlaps with each other, and generating a 3D map for the first path and the second path by using at least a part of the first image set and at least a part of the second image set if the point exists.

According to various embodiments of the present disclosure, the 3D map is generated to switch view from at least some images of the first image set to at least some images of the second image through the overlapping point.

According to various embodiments of the present disclosure, at least one of the first image set and the second image set is obtained to switch view between a plurality of images corresponding to the at least one image set.

According to various embodiments of the present disclosure, at least one of the first image set and the second image set includes or is associated with 3D information for a path corresponding to the at least one image set, out of the first path and the second path generated based on comparison between a first feature point corresponding to the first image of the at least one image set and a second feature point corresponding to the second image of the at least one image set.

According to various embodiments of the present disclosure, the generation of the 3D map includes generating a third image by synthesizing the at least a part of the first image with the at least a part of the second image set, and by additionally using the third image, generating the 3D map such that the generated map includes at least a part of the first path, at least a part of the second path, and the overlapping point.

According to various embodiments of the present disclosure, the generation of the 3D map includes generating at least one 3D information in association with a part of the 3D map or the 3D information, based on comparison between the first feature point identified from the at least a part of the first image set and the second feature point identified from the at least a part of the second image set.

According to various embodiments of the present disclosure, the obtaining of the first image set includes capturing a first image corresponding to a first viewpoint with respect to at least one external object located on or near the first path and a second image corresponding to a second viewpoint with respect to the external object, and generating 3D information regarding the external object by using the first image and the second image.

According to various embodiments of the present disclosure, the obtaining of the first image and the second image includes displaying a guide corresponding to at least one of the first viewpoint and the second viewpoint through a display functionally connected with the electronic device, and automatically capturing at least one of the first image and the second image, which corresponds to the guide, based on sensing of movement of the electronic device corresponding to the guide, through a camera module functionally connected to the electronic device.

According to various embodiments of the present disclosure, at least one of the first image set and the second image set are received from an external device with respect to the electronic device.

According to various embodiments of the present disclosure, the method further includes displaying at least one image corresponding to a current position of the electronic device out of an image set corresponding to the 3D map and switching view from the at least one image to an image corresponding to a new position of the electronic device out of the image set of the 3D map as a reaction to movement of the electronic device.

According to various embodiments of the present disclosure, the generation of the 3D map includes generating, based on identification of at least one feature point from objects included in the 3D map, a map indicating a boundary between the objects in association with the 3D map or as a part of the 3D map.

Figure 13:
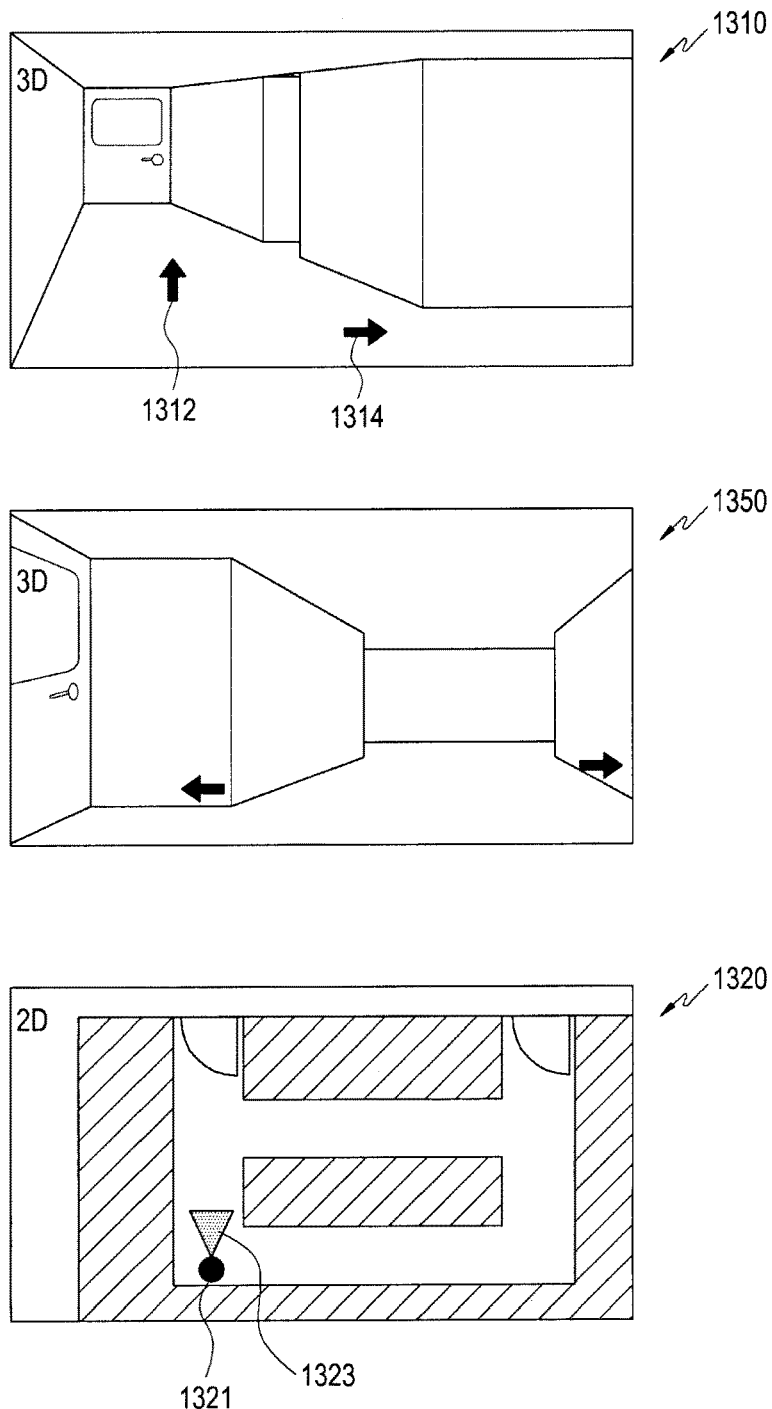
FIG. 13 illustrates an example of a UI for 3D map inquiry in an electronic device according to various embodiments of the present disclosure.

FIG. 13 illustrates an example of a UI for 3D map inquiry in an electronic device according to various embodiments of the present disclosure. Referring to FIG. 13, the electronic device according to various embodiments of the present disclosure provides a 3D map in the form of various dimensions (e.g., a 3D virtual reality form or a 2D plane view form).

The electronic device according to various embodiments of the present disclosure provides an inquiry screen of a 3D map based on a moving direction, an oriented direction, or a position of the electronic device. For example, the electronic device may display a first virtual point 1310 corresponding to the position of the electronic device on the 3D map. The electronic device may display, for example, a 2D map corresponding to the first virtual point 1310. The electronic device may display, for example, an image 1321 corresponding to the position of the electronic device or an image 1323 corresponding to the moving direction of the electronic device on the 2D map.

The electronic device according to various embodiments of the present disclosure may display an interface connecting a plurality of virtual points on a map. For example, if for the first virtual point 1310, there are virtual points connected as a path in the north direction (e.g., toward the emergency exit) and in the east direction (e.g., the passage), respectively, a first connection interface 1312 corresponding to the north direction and a second connection interface 1314 corresponding to the east direction may be displayed.

The electronic device according to various embodiments of the present disclosure switches view from one virtual point to another virtual point, in response to an input with respect to an interface. For example, the electronic device may switch view from the first virtual point to a second virtual point 1350 connected with the first virtual point 1310, in response to an input with respect to the second connection interface 1314.

The electronic device according to various embodiments of the present disclosure displays both a 3D map and a 2D map corresponding thereto on the same screen or displays them on a plurality of separate displays functionally connected with each other. For example, in an environment where a wearable device and a smartphone are connected through wireless communication, the wearable device may display a 2D map and the smartphone may display a 3D map.

Figure 14:
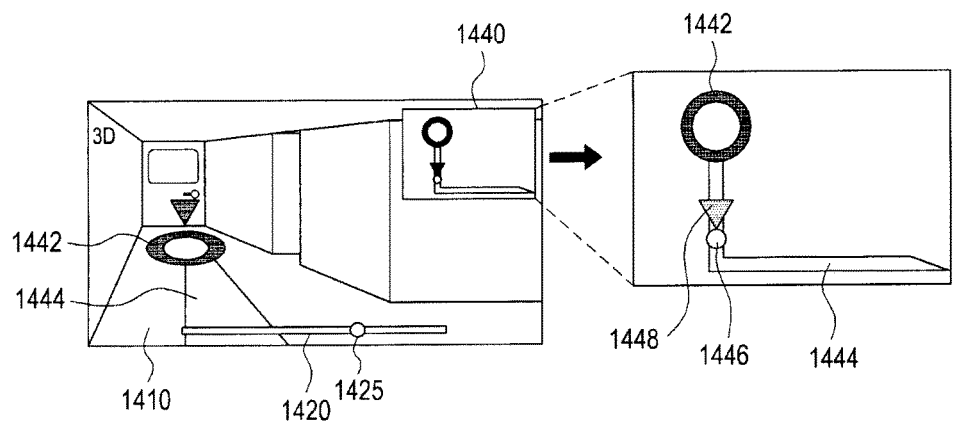
FIG. 14 illustrates a navigation service method for an electronic device according to various embodiments of the present disclosure.

FIG. 14 illustrates a navigation service method for an electronic device according to various embodiments of the present disclosure. Referring to FIG. 14, the electronic device according to various embodiments of the present disclosure displays an image corresponding to each of virtual points changing along a traveling path on the 3D map. For example, the electronic device may switch view from a virtual point 1410 to another virtual point based on position information or movement of the electronic device.

The electronic device according to various embodiments of the present disclosure displays an auxiliary map 1440 for a path to a destination based on the 3D map on at least a part of the screen. For example, the auxiliary map 1440 may include at least one of a destination 1442, a path 1444 from a starting point to a destination, a current position 1446 of the electronic device, and a direction 1448 in which the electronic device is oriented from the current position.

The electronic device according to various embodiments of the present disclosure determines a distance from the starting point to the destination 1442 and displays a timeline 1420 corresponding to the distance. In another example, the electronic device may display a time marker 1425 at a position on the timeline 1420, which corresponds to the current position of the electronic device on the path.

The electronic device according to various embodiments of the present disclosure provides, based on a traveling path of the electronic device from the starting point to the destination 1442, a moving image (e.g., a moving image including a transition effect between images included in several virtual points) for the path.

Figure 15:
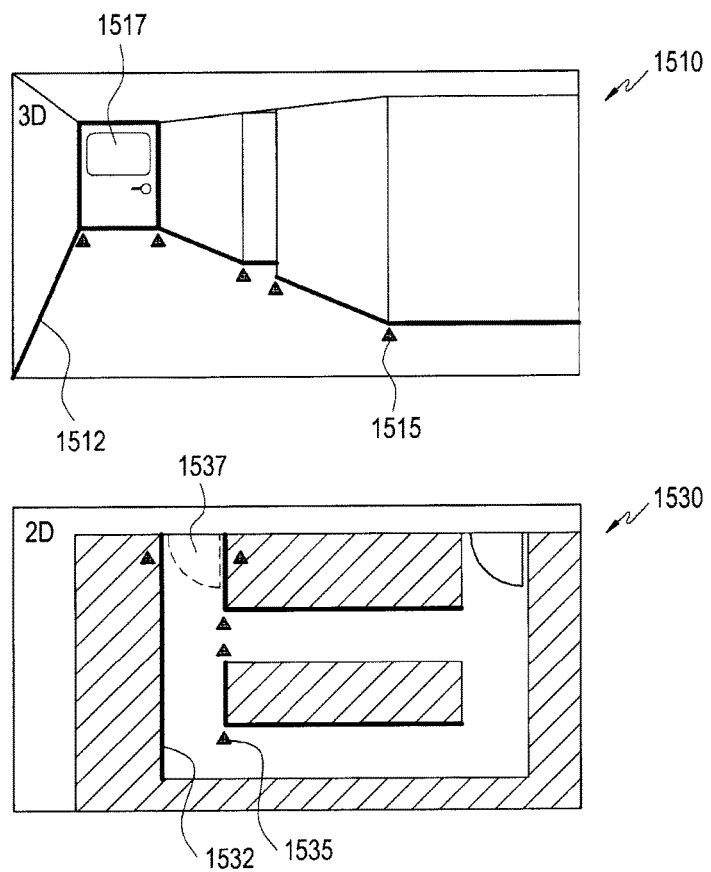
FIG. 15 illustrates an example of a process in which an electronic device converts a 3D map into a 2D map according to various embodiments of the present disclosure.

FIG. 15 illustrates an example for describing a process of converting a 3D map into a 2D map by an electronic device according to various embodiments of the present disclosure. Referring to FIG. 15, the electronic device according to various embodiments of the present disclosure generates a 2D map 1530 from a 3D map 1510. The electronic device determines, based on 3D information determined from images included in the 3D map 1510, a boundary (e.g., a boundary 1512) between objects included in the images. The electronic device generates the 2D map 1530 from the 3D map 1510 based on the boundary.

The electronic device according to various embodiments of the present disclosure determines the boundary 1512 between objects on the 3D map 1510 based on depth information of an image corresponding to each virtual point. For example, the electronic device may determine positions of sub objects (e.g., corners, passages, doors, etc.) based on the boundary 1512 between main objects (e.g, a wall, a floor, etc.). The electronic device may estimate a distance between structures in the image of the 3D map 1510 by using a marker 1515 included in the image.

For example, based on a distance between objects, directions of the objects, or an angle between the objects, the electronic device may form a boundary 1532, a structural characteristic 1537, or a marker 1535 on the 2D map 1530 to correspond to the boundary 1512, the structural characteristic 1517, or the marker 1515 on the 3D map 1510.

Figure 16:
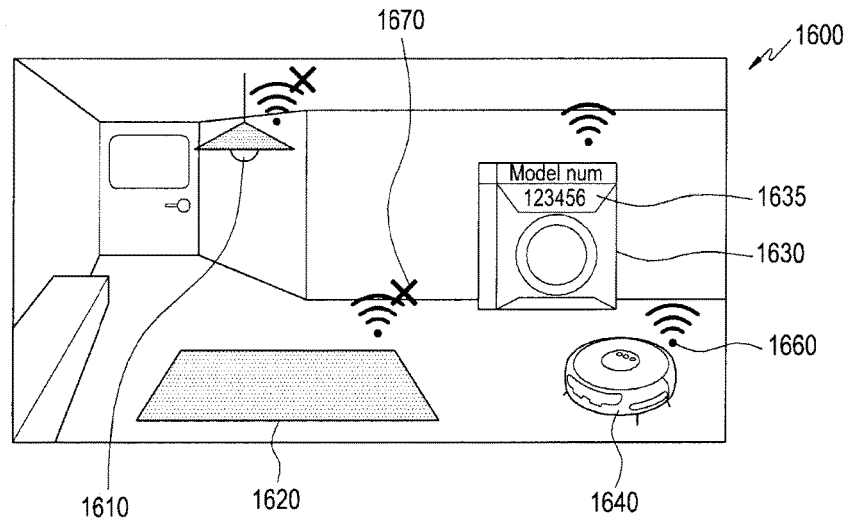
FIG. 16 illustrates a 3D map-based object recognition and connection method for an electronic device according to various embodiments of the present disclosure.

FIG. 16 illustrates object recognition and connection based on a 3D map in an electronic device according to various embodiments of the present disclosure. Referring to FIG. 16, the electronic device according to various embodiments of the present disclosure identifies various objects appearing on an image of a 3D map 1600. For example, the electronic device may identify objects corresponding to a particular virtual point (e.g., an electric light 1610, a carpet 1620, a washing machine 1630, a cleaning robot 1640, etc.) on the 3D map 1600 based on analysis with respect to the 3D map 1600.

According to an embodiment of the present disclosure, the electronic device identifies an object based on an identifier indicated on the 3D map 1600. For example, the electronic device may recognize an identifier 1635 (e.g., "Model num. 123456" indicated on the front surface of the washing machine) indicated on an image included in the 3D map, and recognize at least an area of the image including the identifier 1635 as an object. In another example, the electronic device may obtain a sample image (e.g., a real product image of the washing machine 1630) corresponding to the identifier 1635 from the washing machine 1630 or an external device. The electronic device compares the sample image with the image included in the 3D map 1600 to determine an area of the washing machine 1630 from at least a part of the image.

According to an embodiment of the present disclosure, the electronic device determines whether the object identified on the 3D map 1600 is connectable. For example, the electronic device may sense presence/absence of a communication signal from the object through a discovery operation to determine whether the object is capable of wired/wireless communication. The electronic device may classify the object as a connectivity object or a non-connectivity object based on the determination. If as a result of discovery, the electronic device senses only a radio communication signal from the washing machine 1630 and the cleaning robot 1640, the electronic device may classify the electric light 1610 and the carpet 1620 as non-connectivity objects and the washing machine 1630 and the cleaning robot 1640 as connectivity objects. The electronic device may display a first image 1670 indicating a communication-impossible state in relation to the electric light 1610 and the carpet 1620 determined as the non-connectivity objects. The electronic device may display a second image 1660 indicating a communication-possible state in relation to the washing machine 1630 and the cleaning robot 1640 determined as the connectivity objects.

According to an embodiment of the present disclosure, the electronic device identifies an object based on a user input with respect to at least an area of the 3D map 1600. For example, the electronic device may sense a connectivity object located near the electronic device based on a discovery signal. The electronic device may display information about the sensed connectivity object as a list. The electronic device receives a user input for matching an object shown in the list with the at least an area of the 3D map, and identifies the at least an area as an area of the object, or an object area. For example, the electronic device may display the cleaning robot 1640 in the list based on a radio signal of the cleaning robot 1640. The electronic device determines an area on the 3D map, which is selected as an area corresponding to the cleaning robot 1640 by the user, as an identification area of the cleaning robot 1640.

According to an embodiment of the present disclosure, the electronic device forms connection with the object identified on the 3D map 1600. For example, the electronic device may form connection with the connectivity object by using a wired/wireless communication protocol (e.g., Wi-Fi, Bluetooth, NFC, Zigbee, etc.).

According to an embodiment of the present disclosure, the electronic device stores and manages identification information or connection information for an object. For example, the electronic device may generate a profile for the identified object and periodically update the profile. The electronic device may periodically determine whether the object is capable of wired/wireless communication through discovery, and reflect the determination result to the profile for the object. The profile may be stored in the electronic device or the external device (e.g., the object interworking server etc.). The electronic device may form connection with the object based on the profile corresponding to the object.

Figure 17:
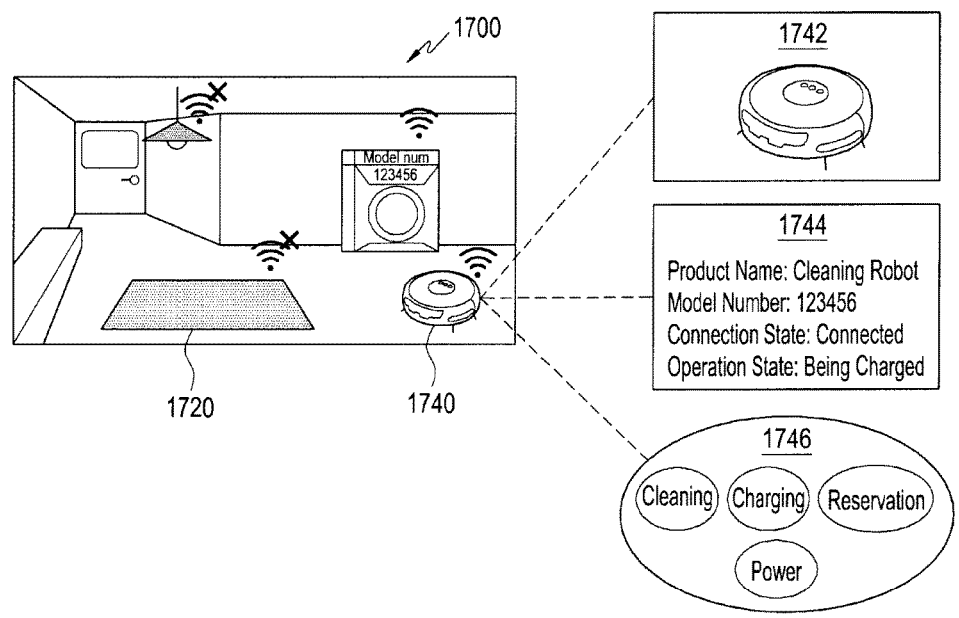
FIG. 17 illustrates a 3D map-based object interworking service method for an electronic device according to various embodiments of the present disclosure.

FIG. 17 illustrates an object interworking service method based on a 3D map in an electronic device according to various embodiments of the present disclosure. Referring to FIG. 17, the electronic device according to various embodiments of the present disclosure obtains information related to an object (e.g., a carpet 1720, a cleaning robot 1740, etc.) appearing on a 3D map 1700. The electronic device obtains information related to an object from the electronic device, the object, or the external device (e.g., the object interworking server etc.). For example, the electronic device obtains the information related to the cleaning robot 1740 through connection formed with the cleaning robot 1740.

The information related to the object according to various embodiments of the present disclosure may include at least one of identification information, connection information, control information, operation state information, and simulation information. For example, the information related to the cleaning robot 1740 may include information such as "product name: cleaning robot", "model number: 123456", "connection state: connected", "operation state: being charged", and so forth.

According to an embodiment of the present disclosure, the electronic device displays information related to the object in relation to the object. For example, the electronic device may display information related to the cleaning robot 1740 (e.g., a product name, a model number, a connection state, an operation state, etc.) through an information window 1744 for the cleaning robot 1740. The electronic device may display a product image 1742 of the cleaning robot 1740 based on the information.

According to an embodiment of the present disclosure, the electronic device displays, based on information related to a connectivity object, an interface for the connectivity object. For example, the electronic device may configure and display a control interface 1746 based on control information regarding the cleaning robot 1740. The electronic device may send a control command corresponding to a function (e.g., cleaning, charging, reservation, or power) selected through the control interface 1746 to the cleaning robot 1740.

According to an embodiment of the present disclosure, the electronic device displays at least some of the information window 1744, the product image 1742, and the interface 1746 on at least a part of the 3D map 1700.

According to an embodiment of the present disclosure, the electronic device configures information about an object based on a user input. For example, if at least a part of information about an object may not be obtained from the object through wired/wireless communication like a non-connectivity object (e.g., the carpet 1720), or if at least a part of the information about the object may not be found, the electronic device may receive the direct input of the information about the object from the user and configure the information related to the object.

Figure 18:
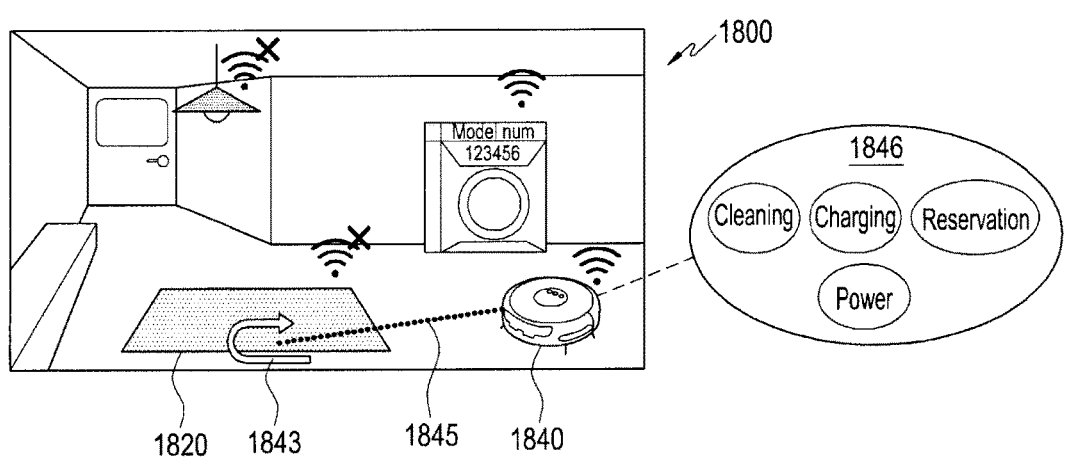
FIG. 18 illustrates an example of a process in which an electronic device controls an object based on a 3D map according to various embodiments of the present disclosure.

FIG. 18 illustrates an example for describing a process of controlling an object based on a 3D map in an electronic device according to various embodiments of the present disclosure. Referring to FIG. 18, the electronic device according to various embodiments of the present disclosure controls a connectivity object (e.g., a cleaning robot 1840) appearing on a 3D map 1800. The electronic device configures an interface 1846 for controlling the connectivity object based on control information for the connectivity object. The electronic device sends a command corresponding to the function to the object for execution of a function selected through the interface. For example, the electronic device may select a cleaning command through the interface 1846 for the cleaning robot 1840. The electronic device sends a control command corresponding to the selected cleaning command to the cleaning robot 1840 based on connection with the cleaning robot 1840.

According to various embodiments of the present disclosure, the electronic device designates another connectivity object or a non-connectivity object as a target for execution of a function of a connectivity object, based on the 3D map 1800. Referring to FIG. 18, for example, the user may select the carpet 1820 as a target on which the cleaning function of the cleaning robot 1840 appearing on the 3D map 1800 is to be performed. The electronic device determines whether execution of the cleaning function of the cleaning robot 1840 on the carpet 1820 is possible, based on control information regarding the cleaning robot 1840 and information related to the carpet 1820, as a reaction to the user's selection. The electronic device delivers a cleaning command including the information related to the carpet 1820 to the cleaning robot 1840 based on the determination. In another example, the electronic device may determine a position and a size of the carpet 1820 based on the information related to the carpet 1820 and may deliver a cleaning command including the position and the size as a cleaning target to the cleaning robot 1840.

According to an embodiment of the present disclosure, the electronic device displays an image related to execution of a function of an object. For example, the electronic device may display an image (e.g., an icon 1843) indicating execution of a function of a connectivity object. The electronic device may display an image (e.g., a dotted line 1845) indicating that another object is designated as a target on which the function of the connectivity object is to be executed.

The electronic device according to various embodiments of the present disclosure may be described as below.

According to various embodiments of the present disclosure, an electronic device includes a memory configured to store an image set and a map platform module which is functionally connected with the memory and is implemented with a processor. The map platform module is configured to obtain an image set comprising a plurality of images for a path on an external space surrounding the electronic device, to determine an area corresponding to an object included in the external space from at least one of the plurality of images, to obtain information about the object based on whether the object is capable of communication connection with the electronic device, and to display the information in association with the area through a display functionally connected with the electronic device.

According to various embodiments of the present disclosure, the map platform module displays a first image and a second image, which are included in the plurality of images, by switching the first image and the second image with each other.

According to various embodiments of the present disclosure, the map platform module displays at least one transition effect in association with the first image or the second image when the first image is switched to the second image.

According to various embodiments of the present disclosure, the map platform module identifies a first feature point from at least a part of a first image included in the plurality of images, identifies a second feature point from at least a part of a second image included in the plurality of images, and generates Three-Dimensional (3D) information regarding the path as a part of the image set, based comparison between the first feature point and the second feature point.

According to various embodiments of the present disclosure, the map platform module determines at least an area of the at least one image as the area based on comparison of a reference image for the object with the at least one image.

According to various embodiments of the present disclosure, the map platform module obtains the information from at least one of an external device and a user input with respect to the electronic device, based on a determination that the object is not capable of communication connection with the electronic device, and obtains the information from at least one of the external device, the user input, or the object, based on a determination that the object is capable of communication connection with the electronic device.

According to various embodiments of the present disclosure, the map platform module obtains at least one of identification information, connection information, control information, operation state information, and simulation information regarding the object, as at least a part of the information, based on a determination that the object is not capable of communication connection with the electronic device.

According to various embodiments of the present disclosure, the map platform module transmits a control signal for controlling the object based on the control information.

According to various embodiments of the present disclosure, the map platform module selects another object for executing at least one function for the object and transmits information about the other object together with the control signal or as at least a part of the control signal.

According to various embodiments of the present disclosure, the information comprises at least one of identification information, connection information, control information, operation state information, and simulation information regarding the object.

According to various embodiments of the present disclosure, the map platform module displays a control interface for controlling the object in association with the area based on control information regarding the object.

According to various embodiments of the present disclosure, the map platform module inserts the information into a part of a 3D map corresponding to the image set.

According to various embodiments of the present disclosure, the map platform module is configured to transmit the information to the external device in response to a request with respect to the electronic device from an external device.

Figure 19:
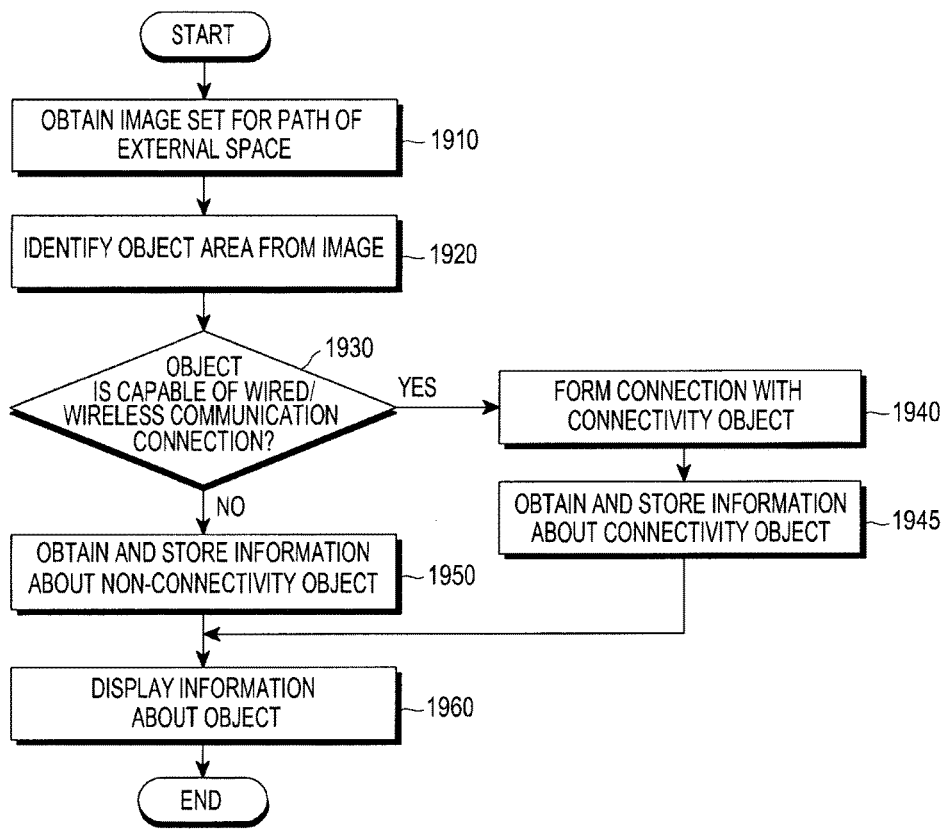
FIG. 19 is a flowchart of a method for displaying information about an object from a 3D map in an electronic device according to various embodiments of the present disclosure.

FIG. 19 is a flowchart of a method for displaying information about an object from a 3D map in an electronic device according to various embodiments of the present disclosure. Referring to FIG. 19, in operation 1910, the electronic device obtains an image set for a path on an external space. The image set may be a 3D map. The electronic device obtains the image set from a camera functionally connected with the electronic device or from an external device.

In operation 1920, the electronic device identifies an area corresponding to an object included in the external space from an image included in the image set. For example, the electronic device may analyze the image to determine a boundary between the object and a background in the image. The electronic device may compare a sample image for the object with the image to determine the area corresponding to the object from the image.

In operation 1930, the electronic device determines whether communication connection with the object corresponding to the area is possible. For example, the electronic device may determine whether communication connection with the object is possible based on a broadcast signal transmitted from the object. The electronic device may determine that the object is a non-connectivity object if failing in sensing a signal related to communication connection from the object or if determining, from a communication connection-related signal, that communication connection between the electronic device and the object is impossible. The electronic device may determine the object as a connectivity object if determining that the object is capable of communication connection with the electronic device from the signal.

In operation 1940, if determining that the object is determined as a connectivity object, the electronic device forms connection with the connectivity object. For example, the electronic device may directly form communication connection with the connectivity object or may form connection with the connectivity object through an external device (e.g., a server) having connection information with respect to the connectivity object.

In operation 1945, the electronic device obtains information about the connectivity object. The electronic device obtains the information from a user input, from an external device, or the connectivity object.

In operation 1950, if the object is determined as a non-connectivity object, the electronic device obtains information about the non-connectivity object. The electronic device obtains the information from a user input or an external device.

In operation 1960, the electronic device displays information about the object. The information may include at least one of identification information, connection information, control information, operation state information, and simulation information regarding the object. For example, the electronic device may display a name, an image, a connection state, or an interface for a function control for the object in association with the image set based on the information about the object.

Figure 20:
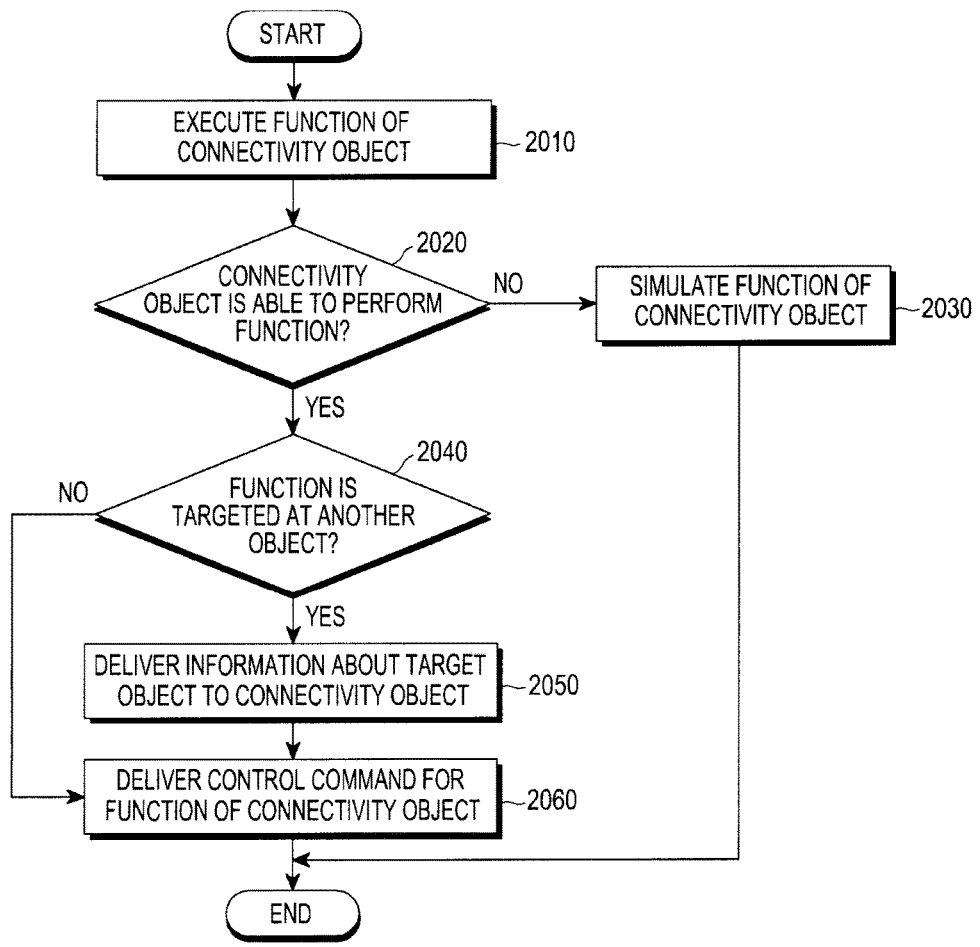
FIG. 20 is a flowchart of a method for controlling an object from a 3D map in an electronic device according to various embodiments of the present disclosure.

FIG. 20 is a flowchart of a method for controlling an object from a 3D map in an electronic device according to various embodiments of the present disclosure. Referring to FIG. 20, in operation 2010, the electronic device executes a function of a connectivity object appearing on a 3D map. For example, the electronic device may obtain an execution command for a particular function from an interface for controlling the connectivity object.

In operation 2020, the electronic device determines whether the connectivity object is in a state of being able to perform the particular function. For example, the electronic device may receive from the connectivity object information about whether the connectivity object can execute the particular function.

In operation 2030, if the connectivity object is in a state of being unable to execute the particular function, the electronic device simulates execution of the particular function. The electronic device simulates the particular function based on simulation information of the connectivity object. The electronic device may display an effect generated by the simulation on at least a part of the 3D map.

In operation 2040, if the connectivity object is in a state of being able to execute the particular function, the electronic device determines whether the particular function is targeted at another object. For example, the electronic device may receive selection of another object as a target for the particular function from an interface for the connectivity object.

In operation 2050, if another object is selected as a target for the particular function, the electronic device delivers information about the other object to the connectivity object. For example, the electronic device may send at least a part of the information about the other object to the connectivity object. The electronic device may send at least a part of the information about the other object, which is necessary for execution of the particular function, through a control signal.

In operation 2060, the electronic device sends a control signal for executing the particular function. The electronic device generates a control signal for executing the particular function based on control information regarding the connectivity object. For example, the electronic device may send the control signal to the connectivity object. In another example, the electronic device may send the control signal to an external device having connection information with respect to the connectivity object.

Operations included in the process or method illustrated in FIGS. 11, 12, 19 and 20 (e.g., operations 1110 through 1140, 1210 through 1240, 1910 through 1960, or 2110 through 2060) may be executed in a sequential, parallel, repetitive or heuristic manner. Also, some of the operations may be executed in different order or omitted, or may have additional different operations.

A method for controlling an electronic device according to various embodiments of the present disclosure may be described as below.

According to various embodiments of the present disclosure, a method for controlling an electronic device includes obtaining, at an electronic device, an image set comprising a plurality of images for a path on an external space surrounding the electronic device, determining an area corresponding to an object included in the external space from at least one of the plurality of images, obtaining information about the object based on whether the object is capable of communication connection with the electronic device, and displaying the information in association with the area through a display functionally connected with the electronic device.

The displaying of the information includes displaying a first image and a second image, which are included in the plurality of images, by switching the first image and the second image with each other.

The displaying of the first image and the second image by switching the first image and the second image with each other includes displaying at least one transition effect in association with the first image or the second image when the first image is switched to the second image.

The obtaining of the image set includes identifying a first feature point from at least a part of a first image included in the plurality of images, identifying a second feature point from at least a part of a second image included in the plurality of images, and generating Three-Dimensional (3D) information regarding the path as a part of the image set, based comparison between the first feature point and the second feature point.

The determining of the area includes determining at least an area of the at least one image as the area based on comparison of a reference image for the object with the at least one image.

The obtaining of the image set includes obtaining the information from at least one of an external device and a user input with respect to the electronic device, based on a determination that the object is not capable of communication connection with the electronic device and obtaining the information from at least one of the external device, the user input, or the object, based on a determination that the object is capable of communication connection with the electronic device.

The information includes at least one of identification information, connection information, control information, operation state information, and simulation information regarding the object.

The method further includes transmitting a control signal for controlling the object based on the control information.

The transmitting of the control signal includes selecting another object for executing at least one function for the object and transmitting information about the other object together with the control signal or as at least a part of the control signal.

The method further includes simulating a function of the object based on simulation information regarding the object and displaying a virtual effect, which is to be exerted on the object due to the simulation, or a virtual effect, which is to be exerted on the external space, in association with the at least one of the plurality of images.

The displaying of the information includes displaying a control interface for controlling the object in association with the area based on control information regarding the object.

The method further includes inserting the information into a part of a 3D map corresponding to the image set.

The method further includes transmitting the information to the external device in response to a request with respect to the electronic device from an external device.

Figure 21:
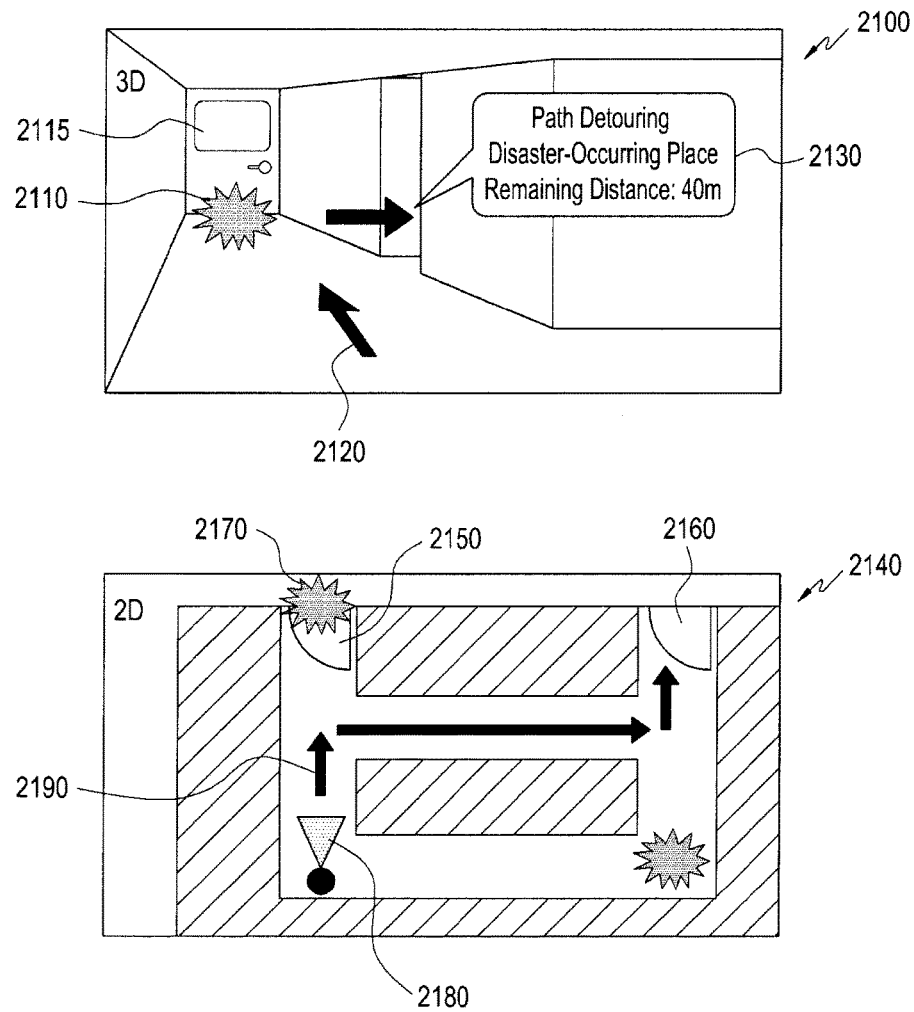
FIG. 21 illustrates a disaster map service in an electronic device according to various embodiments of the present disclosure.

FIG. 21 illustrates a disaster map service method for an electronic device according to various embodiments of the present disclosure. Referring to FIG. 21, the electronic device according to various embodiments of the present disclosure displays a 3D map 2100 in relation to a surrounding circumstance such as a disaster occurs. The electronic device determines and displays a disaster-occurring position 2110 on a 3D map. As the disaster occurs, the electronic device determines and displays a path toward the closest emergency exit from the current position based on the 3D map.

According to an embodiment of the present disclosure, if sensing occurrence of the disaster on a path toward the emergency exit, the electronic device determines another path detouring that disaster-occurring position. For example, the electronic device may determine an emergency exit 2115 that is hard to access due to the disaster-occurring position 2110, and display a path detouring the disaster-occurring position 2110 based on the determination. In another example, the electronic device may display a path 2120 toward another emergency exit (e.g., an emergency exit 2160) other than the emergency exit 2115 that is hard to access.

According to an embodiment of the present disclosure, the electronic device displays information about a path toward an emergency exit. For example, the electronic device may display information 2130 about a path 2120 toward an emergency exit in relation to the path 2120 based on a 3D map. The information about the path may include at least one of a description of the path, the remaining distance to the emergency exit, the remaining time to the emergency exit, and a section requiring attention on the path.

According to various embodiments of the present disclosure, based on a 3D map 2100 for the disaster, the electronic device displays a 2D map 2140 corresponding to the 3D map 2100. For example, the electronic device may match the disaster-occurring position 2110, a hard-to-access emergency exit 2115, and the path 2120 toward another emergency exit (e.g., the emergency exit 2160) on the 3D map 2100 to a disaster-occurring position 2170, the hard-to-access emergency exit 2150, and a path 2190 toward another emergency exit 2160 on the 2D map 2140, respectively. For example, the electronic device may indicate a current position of the electronic device and provide an indication 2180 of a traveling direction of the electronic device on the 2D map 2140.

Figure 22:
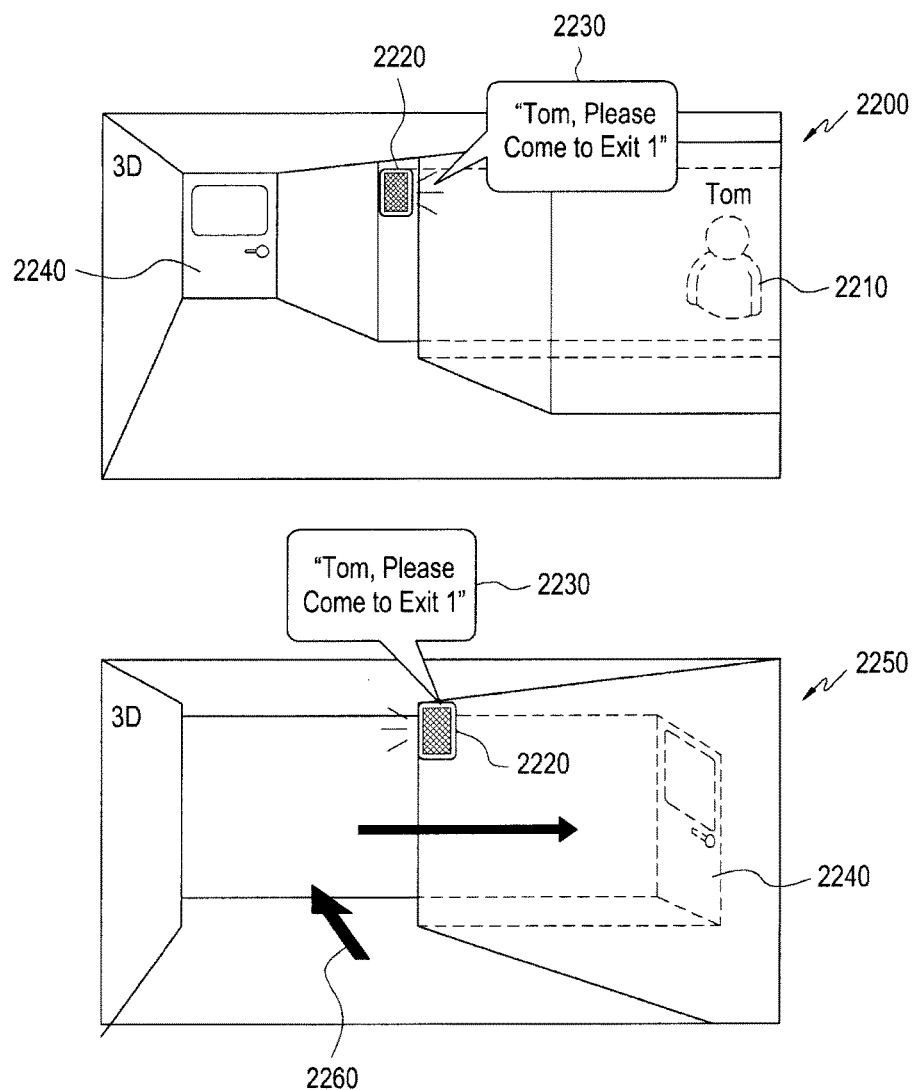
FIG. 22 illustrates a map-sharing service in an electronic device according to various embodiments of the present disclosure.

FIG. 22 illustrates a map sharing service method in an electronic device according to various embodiments of the present disclosure. Referring to FIG. 22, the electronic device according to various embodiments of the present disclosure shares 3D map data with another electronic device (e.g., the electronic device 440). For example, the electronic device may transmit data about a 3D map 2200 to another electronic device (e.g., an electronic device owned by a user 2210 named "Tom"). The data about the 3D map 2200 may include at least one of a position of an emergency exit 2240, a 3D interior structure around the emergency exit 2240, and information about an object (e.g., a speaker 2220) capable of transmitting a message on the 3D map.

Another electronic device (e.g, the electronic device of the user 2210 named "Tom") according to various embodiments of the present disclosure provides an indication 2250 of at least a part of the shared 3D map data based on a viewpoint of the another electronic device. For example, the indication may include at least one of displaying the received 3D map data and displaying a new 3D map (e.g., a 3D map synthesized by a map platform module) processed using at least a part of the received 3D map data.

The electronic device according to various embodiments of the present disclosure shares position information with another electronic device (e.g., the electronic device 440). The electronic device sends a request for position information to another electronic device and receives the position information regarding the other electronic device in response to the request. The electronic device displays the position of the other electronic device on the 3D map based on the position information. For example, the electronic device may indicate the position of the other electronic device (e.g., an image in the form of a person or a name of the user) on the 3D map based on the position information regarding the other electronic device (e.g., the electronic device of the user 2210 named "Tom").

The electronic device according to various embodiments of the present disclosure provides information to another electronic device (e.g., the electronic device 440) based on 3D map data or position information shared with the other electronic device. For example, the electronic device may control the speaker 2220 appearing on the 3D map 2200. The electronic device may send a message 2230 (e.g., a voice message encouraging the user of another electronic device to come to the nearest emergency exit) to the user (e.g., the user 2210 named "Tom") through the speaker 2220. For example, the electronic device may determine a path 2260 destined to the emergency exit 2240 from the position of the user 2210 named "Tom," by using the shared 3D map data and position information. The electronic device may provide or display the path 2260 to another electronic device.

The electronic device and method according to an embodiment of the present disclosure may generate various forms of maps by using an image and various information corresponding to the image through the electronic device. Moreover, a new map may be generated by synthesizing maps generated in various environments to accumulate a large amount of map information and may be expanded to various forms of map information. The electronic device and method according to an embodiment of the present disclosure may obtain information about an object appearing on a map in various ways. Furthermore, an object appearing on a map may be identified and controlled in various manners.

The computer readable recording medium includes magnetic media such as hard disk, floppy disk, or magnetic tape, Optical Media such as Compact Disc Read Only Memory (CD-ROM) or Digital Versatile Disc (DVD), Magneto-Optical Media such as floptical disk, and a hardware device such as ROM. RAM, flash memory storing and executing program commands. Further, the program instructions include a machine language code created by a complier and a high-level language code executable by a computer using an interpreter. The foregoing hardware device may be configured to be operated as at least one software module to perform an operation of the present disclosure, or vice versa.

A storage medium according to various embodiments of the present disclosure may be described as below.

According to various embodiments, in a storage medium having stored therein commands which are set, when being executed by at least one processors, to cause the at least one processors to perform at least one operations, the at least one operations include obtaining an image set comprising a plurality of images for a path on an external space surrounding an electronic device, determining an area corresponding to an object included in the external space from at least one of the plurality of images, obtaining information about the object based on whether the object is capable of communication connection with the electronic device, and displaying the information in association with the area through a display functionally connected with the electronic device.

According to various embodiments, in a storage medium having stored therein commands which are set, when being executed by at least one processors, to cause the at least one processors to perform at least one operations, the at least one operations include obtaining a first image set including a plurality of images for a first path on an external space surrounding an electronic device, obtaining a second image set including a plurality of images of a second path on the external space, determining whether a point exists where the first path and the second path overlaps with each other, and generating a 3D map for the first path and the second path by using at least a part of the first image set and at least a part of the second image set if the point exists.

Modules or programming modules according to various embodiments of the present disclosure may include one or more of the foregoing elements, have some of the foregoing elements omitted, or further include additional other elements. Operations performed by the modules, the programming modules or other elements may be executed in a sequential, parallel, repetitive or heuristic manner. Also, some of the operations may be executed in different order or omitted, or may have additional different operations. The embodiments disclosed herein have been provided for description and understanding of disclosed technical matters, and are not intended to limit the scope of the present disclosure. Therefore, it should be construed that the scope of the present disclosure includes any change or other various embodiments based on the technical spirit of the present disclosure.

As is apparent from the foregoing description, the electronic device and method according to various embodiments of the present disclosure may obtain information about objects appearing on the map in various ways. Moreover, those objects may be identified and controlled using a variety of methods.

Various changes in form or detail may be made to the present disclosure by one of ordinary skill in the art without departing from the scope of the present disclosure, and the present disclosure is not limited to the above-described embodiments and the accompanying drawings.

The above-described embodiments of the present disclosure can be implemented in hardware, firmware or via the execution of software or computer code that can be stored in a recording medium such as a CD ROM, a Digital Versatile Disc (DVD), a magnet is tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Any of the functions and steps provided in the Figures may be implemented in hardware, or a combination hardware configured with machine executable code and may be performed in whole or in part within the programmed instructions of a computer. No claim element herein is to be construed under the provisions of 35 U.S.C. 112, sixth paragraph, unless the element is expressly recited using the phrase "means for."

The invention claimed is:

1. A method for controlling an electronic device, the method comprising:
   obtaining a first plurality of images corresponding to a first location in an external space surrounding the electronic device and a second plurality of images corresponding to a second location in the external space, wherein the obtaining comprises:
      displaying a capturing guide indicating a direction for the electronic device to be moved; and
      when a capturing focus of a camera of the electronic device matches the direction, automatically capturing an image corresponding to the direction to be included in the first plurality of images or the second plurality of images;
   when a difference between a first time of capture for the first plurality of images and a second time of capture for the second plurality of images is smaller than a predetermined value, generating a 3D map of the external space based on the first plurality of images and the second plurality of images;
   when the difference is equal to or greater than the predetermined value, overwriting previously stored image data with the first plurality of images or the second plurality of images;
   identifying in the Three-Dimensional (3D) map an area corresponding to a first object and another area corresponding to a second object;
   determining whether the first object and the second object are each capable of communicatively connecting with the electronic device;
   when the first object is determined to be capable of communicatively connecting with the electronic device, connecting to the first object to obtain information relating to the first object;
   displaying at least one of identification information of the first object, an indicator for indicating whether the first object is capable of communicating with the electronic device or not, a control interface for controlling the first object, and operation state information of the first object based on the information relating to the first object on a display;
   when the second object is determined to be incapable of communicatively connecting with the electronic device:
      obtaining information relating to the second object;
      receiving a selection of the second object by a user; and
      transmitting a control signal to the first object that includes the information relating to the second object.

2. The method of claim 1, further comprising displaying a first image and a second image, which are included in the first plurality of images or the second plurality of images, by switching the first image with the second image.

3. The method of claim 2, wherein the displaying of the first image and the second image by switching the first image with the second image comprises:
   displaying at least one transition effect corresponding to the first image or the second image when the first image is switched with the second image.

4. The method of claim 1, wherein the obtaining of the image set comprises:
   identifying a first feature point from at least a part of a first image included in the first plurality of images or the second plurality of images;
   identifying a second feature point from at least a part of a second image included in the first plurality of images or the second plurality of images; and
   generating (3D) information regarding a path corresponding to the external space based on comparison between the first feature point and the second feature point.

5. The method of claim 1, wherein the area corresponding to the first object and the other area corresponding to the second object are identified based on reference images for the first object and the second object.

6. The method of claim 1, wherein the obtaining of the information relating to the first object comprises:
   obtaining the information from at least one of an external device, a user input, or the first object, based on a determination that the first object is capable of a communication connection with the electronic device.

7. The method of claim 1, further comprising:
   simulating a function of the first object based on simulation information of the first object; and
   displaying a virtual effect to be applied to on the first object or a virtual effect to be applied to the external space based on the simulation.

8. The method of claim 1, further comprising:
   inserting the information into a part of the 3D map of the external space; and
   converting the 3D map of the external space into a two-dimensional map.

9. The method of claim 1, further comprising transmitting the information relating to the first object or the second object to an external device.

10. An electronic device comprising:
    a memory configured to store an image set; and
    at least one processor operatively coupled to the memory, the at least one processor configured to:
       obtain a first plurality of images corresponding to a first location in an external space surrounding the electronic device and a second plurality of images corresponding to a second location in the external space, wherein obtaining the first or second plurality of images comprises:
          display a capturing guide indicating a direction for the electronic device to be moved; and
          when a capturing focus of a camera of the electronic device matches the direction, automatically capture an image corresponding to the direction to be included in the first plurality of images or the second plurality of images;
       when a difference between a first time of capture for the first plurality of images and a second time of capture for the second plurality of images is smaller than a predetermined value, generate a 3D map of the external space based on the first plurality of images;
       when the difference is equal to or greater than the predetermined value, overwrite previously stored image data with the first plurality of images or the second plurality of images;
       identify in the 3D map an area corresponding to a first object and another area corresponding to a second object;
       determine whether the first object and the second object are each capable of communicatively connecting with the electronic device;

when the first object is determined to be capable of communicatively connecting with the electronic device, connect to the first object to obtain information relating the first object;

display at least one of identification information of the first object, an indicator for indicating whether the first object is capable of communicating with the electronic device or not, a control interface for controlling the first object, and operation state information of the first object based on the information relating to the first object on a display;

when the second object is determined to be incapable of communicatively connecting with the electronic device:

obtain information relating to the second object;

receive a selection of the second object by a user; and transmit a control signal to the first object that includes the information relating to the second object.

11. The electronic device of claim 10, wherein the at least one processor is configured to display a first image and a second image of the first plurality of images or the second plurality of images by switching the first image with the second image.

12. The electronic device of claim 11, wherein the at least one processor is configured to display at least one transition effect corresponding to the first image or the second image when the first image is switched with the second image.

13. The electronic device of claim 10, wherein the at least one processor is configured to identify a first feature point from at least a part of a first image included in the first plurality of images or the second plurality of images, identify a second feature point from at least a part of a second image included in the first plurality of images or the second plurality of images, and generates three-dimensional information regarding a path corresponding to the external space based on comparison between the first feature point and the second feature point.

14. The electronic device of claim 10, wherein the area corresponding to the first object and the other area corresponding to the second object are identified based on reference images for the first object and the second object.

15. The electronic device of claim 10, wherein the at least one processor is configured to obtain the information relating to the first object from at least one of an external device, a user input, or the first object, based on a determination that the first object is capable of communication connection with the electronic device.

16. The electronic device of claim 10, wherein the information relating to the second object comprises at least one of identification information, connection information, control information, operation state information, and simulation information regarding the second object.

17. The electronic device of claim 10, wherein the at least one processor is configured to:

insert the information into a part of the 3D map of the external space; and convert the 3D map of the external space into a two-dimensional map.

18. The electronic device of claim 10, wherein the at least one processor is configured to transmit the information relating to the first object or the second object to an external device.

19. A non-transitory computer-readable medium configured to direct at least one processor to perform at least one operation, the at least one operation comprising:

obtaining a first plurality of images corresponding to a first location in an external space surrounding an electronic device and a second plurality of images corresponding to a second location in the external space, wherein the obtaining comprises:

displaying a capturing guide indicating a direction for the electronic device to be moved; and when a capturing focus of a camera of the electronic device matches the direction, automatically capturing an image corresponding to the direction to be included in the first plurality of images or the second plurality of images;

when a difference between a first time of capture for the first plurality of images and a second time of capture for the second plurality of images is smaller than a predetermined value, generating a 3D map of the external space based on the first plurality of images and the second plurality of images;

when the difference is equal to or greater than the predetermined value, overwriting previously stored image data with the first plurality of images or the second plurality of images;

identifying in the 3D map an area corresponding to a first object and another area corresponding to a second object;

determining whether the first object and the second object are each capable of communicatively connecting with the electronic device;

when the first object is determined to be capable of communicatively connecting with the electronic device, connecting to the first object to obtain information relating the first object;

displaying at least one of identification information of the first object, an indicator for indicating whether the first object is capable of communicating with the electronic device or not, a control interface for controlling the first object, and operation state information of the first object based on the information relating to the first object on a display;

when the second object is determined to be incapable of communicatively connecting with the electronic device:

obtaining information relating to the second object;

receiving a selection of the second object at the electronic device by a user; and transmitting a control signal to the first object that includes the information relating to the second object.

20. A method for controlling an electronic device, the method comprising:

obtaining a first plurality of images corresponding to a first location in an external space surrounding the electronic device and a second plurality of images corresponding to a second location in the external space, wherein the obtaining comprises:

displaying a capturing guide indicating a direction for the electronic device to be moved; and when a capturing focus of a camera of the electronic device matches the direction, automatically capturing an image corresponding to the direction to be included in the first plurality of images or the second plurality of images;

when a difference between a first time of capture for the first plurality of images and second time of capture for the second plurality of images is smaller than a predetermined value, generating a 3D map of the external space based on the first plurality of images and the second plurality of images;

when the difference is equal to or greater than the predetermined value, overwriting previously stored image data with the first plurality of images or the second plurality of images;

transmitting the generated 3D map to an external device;

determining a location of the external device on the generated 3D map; and displaying, at the external device, the generated 3D map from a perspective based on the location of the external device.

21. An electronic device comprising:

a memory configured to store an image set; and at least one processor operatively coupled to the memory, the at least one processor configured to:

obtain a first plurality of images corresponding to a first location of an external space surrounding the electronic device and a second plurality of images corresponding to a second location in the external space, wherein obtaining the first or second plurality of images comprises:

display a capturing guide indicating a direction for the electronic device to be moved; and when a capturing focus of a camera of the electronic device matches the direction, automatically capture an image corresponding to the direction to be included in the first plurality of images or the second plurality of images;

when a difference between a first time of capture for the first plurality of images and second time of capture for the second plurality of images is smaller than a predetermined value, generate a 3D map of the external space based on the first plurality of images and the second plurality of images;

when the difference is equal to or greater than the predetermined value, overwrite previously stored image data with the first plurality of images or the second plurality of images;

transmit the generated 3D map to an external device;

determine a location of the external device on the generated 3D map; and display, at the external device, the generated 3D map from a perspective based on the location of the external device.

\* \* \* \* \*